(12) United States Patent
Amirijoo et al.

(10) Patent No.: US 9,516,629 B2
(45) Date of Patent: Dec. 6, 2016

(54) METHOD AND NETWORK NODE FOR SUPPORTING COMPENSATION OF CELL OUTAGE IN A CELLULAR COMMUNICATIONS NETWORK

(75) Inventors: Mehdi Amirijoo, Linköping (SE); Fredrik Gunnarsson, Linköping (SE); Johan Moe, Mantorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 16 days.

(21) Appl. No.: 14/419,788

(22) PCT Filed: Aug. 9, 2012

(86) PCT No.: PCT/SE2012/050866
§ 371 (c)(1),
(2), (4) Date: Feb. 5, 2015

(87) PCT Pub. No.: WO2014/025296
PCT Pub. Date: Feb. 13, 2014

(65) Prior Publication Data
US 2015/0215927 A1   Jul. 30, 2015

(51) Int. Cl.
*H04W 72/04* (2009.01)
*H04W 16/10* (2009.01)
(Continued)

(52) U.S. Cl.
CPC ........ *H04W 72/0413* (2013.01); *H04L 5/0073* (2013.01); *H04W 16/10* (2013.01); *H04W 72/085* (2013.01)

(58) Field of Classification Search
CPC ......... H04W 72/0413; H04W 72/085; H04W 16/10; H04L 5/0073
See application file for complete search history.

(56) References Cited

U.S. PATENT DOCUMENTS

2009/0069008 A1   3/2009   Highsmith et al.
2010/0210255 A1   8/2010   Amirijoo et al.
(Continued)

FOREIGN PATENT DOCUMENTS

WO   2011102767 A1   8/2011
WO   2012067555 A1   5/2012

OTHER PUBLICATIONS

4G Americas, Self-Optimizing Networks: The Benefits of SON in LTE, XP55083688, Jul. 2011, pp. 1-69.
(Continued)

*Primary Examiner* — Paul H Masur
*Assistant Examiner* — Kabir Jahangir
(74) *Attorney, Agent, or Firm* — Patent Portfolio Builders, PLLC

(57) ABSTRACT

A method in, and a network node (110, 140), for supporting compensation of cell outage in a cellular communications network (100). The cellular communications network (100) comprises a compensating cell (135) for compensating the cell outage and a supporting cell (115) neighboring the compensating cell (135). The network node (110, 140) obtains (502, 1202) a sub-band of a system bandwidth for uplink scheduling of resources for the compensating cell (135). The network node (110, 140) schedules (503, 1203), in response to the cell outage, resources for the supporting cell (115) with restricted uplink scheduling within the sub-band. The network node applies (504, 1204) the scheduled resources in the supporting cell (115), thereby supporting the compensation of cell outage. As a result, higher Signal to Interference and Noise Ratio (SINR) is enabled in the uplink in the compensating cell. This may e.g. be utilized to let the compensating cell cover a larger area of an outage cell than else would be possible, and/or to serve user equipments located therein with improved performance.

36 Claims, 13 Drawing Sheets

(51) Int. Cl.
   H04L 5/00      (2006.01)
   H04W 72/08    (2009.01)

(56) References Cited

U.S. PATENT DOCUMENTS

2010/0216453 A1*  8/2010  Kallin ................... H04W 48/20
                                                               455/424
2010/0278038 A1* 11/2010  Stahle ................... H04W 24/04
                                                               370/216
2012/0307697 A1  12/2012  Mukhopadhyay

OTHER PUBLICATIONS

Amirijoo, M. et al., Effectiveness of cell outage compensation in LTE networks, IEEE Consumer Communications and Networking Conference (CCNC), XP031866008, Jan. 9-12, 2011, pp. 642-647.

"Blume, O. et al. Energy savings in mobile networks based on adaptation to traffic statistics, Bell Labs Technical Journal, vol. 15, No. 2, XP001555947, 2010, pp. 77-94.".

3GPP, "3rd Generation Partnership Project; Technical Specification Group Radio Access Network; Evolved Universal Terrestrial Radio Access Network (E-UTRAN); X2 application protocol (X2AP) (Release 11)", 3GPP TS 36.423 V11.1.0, Jun. 2012, 1-134.

Boudreau, Gary et al., "Interference Coordination and Cancellation for 4G Networks", IEEE Communications Magazine, LTE Part II: 3GPP Release 8, Apr. 2009, 74-81.

Elayoubi, et al., "Performance Evaluation of Frequency Planning Schemes in OFDMA-based Networks", IEEE Transactions on Wireless Communications, vol. 7, No. 5, May 2008, 1623-1633.

Unknown, Author, "3rd Generation Partnership Project; Technical Specification Group Radio Access Network; Evolved Universal Terrestrial Radio Access Network (E-UTRAN); Carrier-based HetNet ICIC use cases and solutions (Release 11)", 3GPP TR 03.024 V0.3.0, May 2012, 1-19.

* cited by examiner

METHOD AND NETWORK NODE FOR SUPPORTING COMPENSATION OF CELL OUTAGE IN A CELLULAR COMMUNICATIONS NETWORK

TECHNICAL FIELD

Embodiments herein relate to a method in a network node and a network node. In particular embodiments herein relate to compensation of cell outage in a cellular communications network.

BACKGROUND

Communication devices such as User Equipments (UEs) are also known as e.g. mobile terminals, wireless terminals and/or mobile stations. A user equipment is enabled to communicate wirelessly in a cellular communications network, wireless communications system, or radio communications system, sometimes also referred to as a cellular radio system or cellular network. The communication may be performed e.g. between two user equipments, between a user equipment and a regular telephone and/or between a user equipment and a server via a Radio Access Network (RAN) and possibly one or more core networks, comprised within the cellular communications network.

The user equipment may further be referred to as a mobile telephone, cellular telephone, laptop, Personal Digital Assistant (PDA), tablet computer, surf plate, just to mention some further examples. The user equipment in the present context may be, for example, portable, pocket-storable, hand-held, computer-comprised, or vehicle-mounted mobile device, enabled to communicate voice and/or data, via the RAN, with another entity, such as another user equipment or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. By the base station serving a cell is meant that the radio coverage is provided such that one or many user equipments located in the geographical area where the radio coverage is provided may be served by the base station. One base station may serve one or several cells. Further, each base station may support one or several communication technologies. The base stations communicate over the air interface operating on radio frequencies with the user equipment within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies, for example into evolved UTRAN (E-UTRAN) used in LTE.

In the context of this disclosure, the expression downlink (DL) is used for the transmission path from the base station to the user equipment. The expression uplink (UL) is used for the transmission path in the opposite direction i.e. from the user equipment to the base station.

In current cellular communications network there are situations when a cell is in outage. Such cell may be referred to as an outage cell. The outage cell is a cell normally able to serve one or more user equipments, but that is malfunctioning in this regard for some reason. The reason may e.g. hardware or software failure in a base station that normally serve the cell, but can also be that the cell deliberately has been put in a temporal inactive state, such as for repair or maintenance of the base station. By user equipment served in a cell is referred to, in a shorter and more convenient manner, that the user equipment is located in the geographical area where the radio coverage is provided by the base station serving the cell and that the user equipment is being served by the base station.

Hence, when a cell is in outage, no user equipment is able to be served in the cell and if there is no possibility to connect to another base station in the neighbourhood, a coverage hole is created in the cellular communications network. In addition to negative consequences for a user equipment that no longer can access services in the cellular communications network, the situation is also highly undesirable for an operator of the cellular communications network. For example, potential revenue is missed from loss of traffic in the outage cell. Also customer satisfaction may be damaged.

A common practice today is that the operator aims at restoring the original coverage by correcting the cell outage, but that no compensational measures are taken in the meantime.

WO2011/102767A1 discloses a method and a device for automated compensation for a cell/sector outage. Parameters of uplink power control are adjusted in order to trade-off coverage versus quality. The uplink power control parameters can be continuously optimized in response to traffic and network characteristics thereby providing for an optimized performance degradation in cells surrounding the coverage hole.

Nevertheless, it is still desirable with further improvements for compensating cell outage.

SUMMARY

In view of the above, an object of embodiments herein is to overcome, or at least alleviate, problems in the prior art, or to present an alternative solution. More specifically the object is to enable improved compensation of cell outage in a cellular communications network.

According to a first aspect of embodiments herein, the object is achieved by a method in a network node for supporting compensation of cell outage in a cellular communications network. The cellular communications network comprises a compensating cell for compensating the cell outage and a supporting cell neighbouring the compensating cell. The network node obtains a sub-band of a system bandwidth for uplink scheduling of resources for the compensating cell. Further, the network node schedules, in response to the cell outage, resources for the supporting cell with restricted uplink scheduling within the sub-band. The network node then applies the scheduled resources in the supporting cell, thereby supporting the compensation of cell outage by causing less interference within the sub-band in the compensating cell.

According to a second aspect of embodiments herein, the object is achieved by a network node for supporting compensation of cell outage in a cellular communications network. The cellular communications network comprises a compensating cell for compensating the cell outage and a supporting cell neighbouring the compensating cell. The network node comprises an obtaining circuitry configured to obtain a sub-band of a system bandwidth for uplink scheduling of resources for the compensating cell. The network node further comprises a scheduling circuitry configured to, in response to the cell outage, schedule resources for the supporting cell with restricted uplink scheduling within the sub-band. Moreover, the network node comprises an applying circuitry configured to apply the scheduled resources in the supporting cell, thereby supporting the compensation of cell outage by causing less interference within the sub-band in the compensating cell.

Said less interference within the sub-band in the compensating cell means that a higher Signal to Interference and Noise Ratio (SINR) is enabled in the uplink for user equipments served in the compensating cell, when these are scheduled within sub-band. The higher SINR being enabled is particular advantageous for a user equipment being served in the compensating cell in the geographical area where the user equipment before the cell outage would have been served in the outage cell. This since such area typically is so remote from the compensating base station that a user equipment located in the compensated area is only able to reach the compensating base station with signals weaker than normally received by the compensating base station, i.e. weaker than in a non-outage situation. As recognized by the skilled person, higher SINR makes it possible serve a user equipment using weaker signals. The higher SINR being enabled may e.g. be utilized to let the compensating cell cover a larger area of the outage cell than else would be possible, and/or serve user equipments located therein with improved performance. Hence embodiments herein support improved compensation of cell outage.

As will be recognized by the skilled person, particular and further advantages of embodiments herein include that very little or no human intervention may be required when compensating for the cell outages and that embodiments herein are well suited for automatic handling for compensating cell outages. Thus embodiments herein support implementation in Self Organizing Networks (SONs). Automatization enables shorter response time and faster reaction to outages. In the end the result is more satisfied users and customers of the operators of the cellular communications network, and also reduced revenue loss for the operators in case of cell outages.

BRIEF DESCRIPTION OF THE DRAWINGS

Examples of embodiments herein are described in more detail with reference to the appended schematic drawings, in which.

DESCRIPTION

As part of the development towards embodiments herein, the situation and problem indicated in the Background will first be further discussed, with particular reference to LTE.

Figure 1:
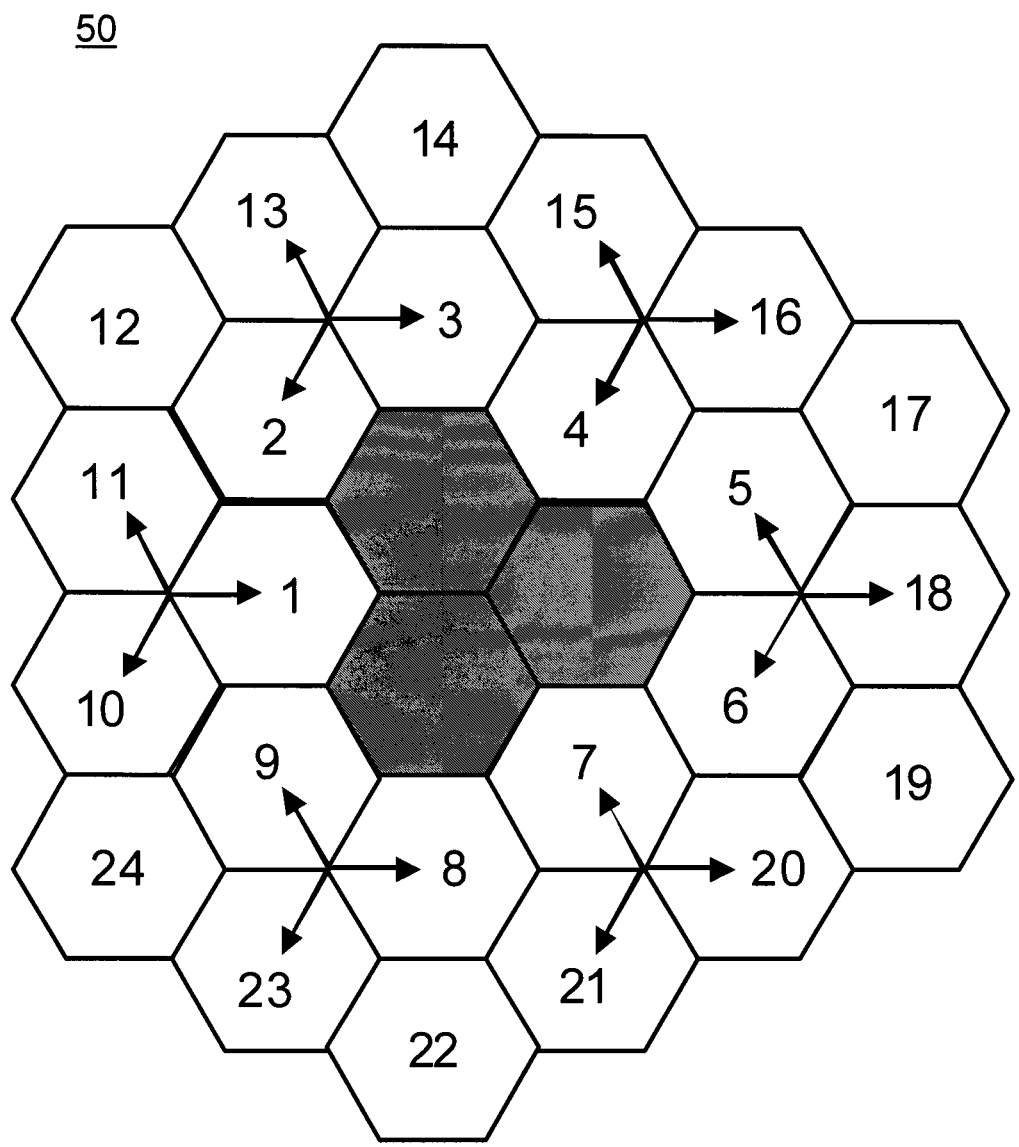
FIG. 1 is a schematic block diagram depicting an example of a cellular communications network.

FIG. 1 is a schematic block diagram depicting an example of a cellular communications network 50 with cells that are in outage, shown as a dark striped area in the middle, surrounded by cells 1-24 that are working, i.e. non-outage cells, according to embodiments herein. As already mentioned in the Background, a cell in outage, which also may be referred to as an outage cell, is a cell normally able to serve one or more user equipments (UEs) but that is malfunctioning in this regard for some reason. The reason may be e.g. hardware or software failure in a base station that normally serve the cell, but can also be that the cell deliberately has been put in a temporal inactive state, such as for repair or maintenance of the base station. Some or all of the surrounding cells 1-24 shown in FIG. 1 may be one or more compensating cells for the cells in outage and one or more supporting cells for the compensating cells. By a compensating cell herein meant a cell that has been configured to compensate the cell outage by serving one or more UEs in a geographical area where said one or more UEs before the cell outage would have been served in a cell that is in outage. In the following, such geographical area may be referred to as a compensated area. The compensating cell is typically also configured to serve one or more UEs located in a geographical area where said one or more user equipments even before the cell outage would have been served in the compensating cell. The compensating cells and supporting cells may be determined as disclosed in WO2011/102767A1, mentioned above in the Background.

Hence, one or more cells that in some sense are considered best capable of serving UEs in a geographical area where said one or more user equipments before the cell outage instead would have been served in a cell that is in outage, may be used as the compensating cells. For example, one or more of cells 1-9 in FIG. 1, which are closest neighbour cells to the cells in outage, may be compensating cells, such as cells 1, 4, and 7. Determining which cell or cells to be compensating cells may be made using a multitude of different approaches, some of which include:

Simulation or predictions

Network measurements, e.g., Handover (HO) rates

UE reports, e.g., Reference Signal Received Power (RSRP) and Reference Signal Received Quality (RSRQ)

For example, each UE may report a neighbouring cell to the cell the UE is served in, which neighbouring cell has sufficient high quality and which may serve as a candidate for HO. By measuring the number of times the UEs report a certain neighbouring cell as well as including information regarding the strength of this particular neighbouring cell, using e.g. RSRP and/or RSRQ measurements, a list of candidate neighbouring cells that are candidates to be compensating cells, may be determined. Further, by considering other network-oriented mobility measurements, e.g. HO rate, the suitability of a neighbouring cell for use as a compensating cell may also be established.

Further, one or more cells that are neighbouring the one or more compensating cells may be used as the one or more supporting cells. By one cell neighbouring another cell is herein meant that the cells are adjacent each other or in a vicinity of each other. Typically neighbouring cells have at least partly overlapping geographical areas where radio coverage is provided for serving of one or more UEs in respective cell. By a supporting cell neighbouring a compensating cell, is herein meant that the supporting cell and the compensating cell are at least so adjacent each other that a UE served in the supporting cell may be expected to cause interference in the compensating cell in the above-mentioned compensated area. The caused interference may be substantial in the sense that removal or reduction of it would have a noticeable positive effect on the ability of serving a UE in the compensated area.

Hence, one or more neighbouring cells to the one or more compensating cells, which neighbouring cells are such that cause substantial, or strongest, interference in the one or more compensating cells, may be used as the supporting cells. The one or more supporting cells may be the closest neighbour cells to the one or more compensating cells. For example, still referring to FIG. 1, if the compensating cells are cells 1, 4, and 7, then the supporting cells may be cells 10, 11, 2, 3, 15, 16, 5, 6, 20, 21, 8, and 9. As realized by the skilled person, determining which cell or cells to be supporting cells may be made using a multitude of different approaches that may, mutatis mutandis, correspond to the ones described above for determining which cell or cells to be compensating cells.

Said WO2001/102767A1 relates to adjusting uplink power control parameters in supporting cells and in compensating cells in order to compensate a cell outage. Embodiments herein, as will be described in detail below, relates to resource scheduling utilizing a Low Interference Bandwidth (LIB) being a sub-band of a system bandwidth for uplink scheduling of resources for a compensating cell, and may be used as a supplement or alternative to the adjusting of uplink power control parameters.

Figure 2:
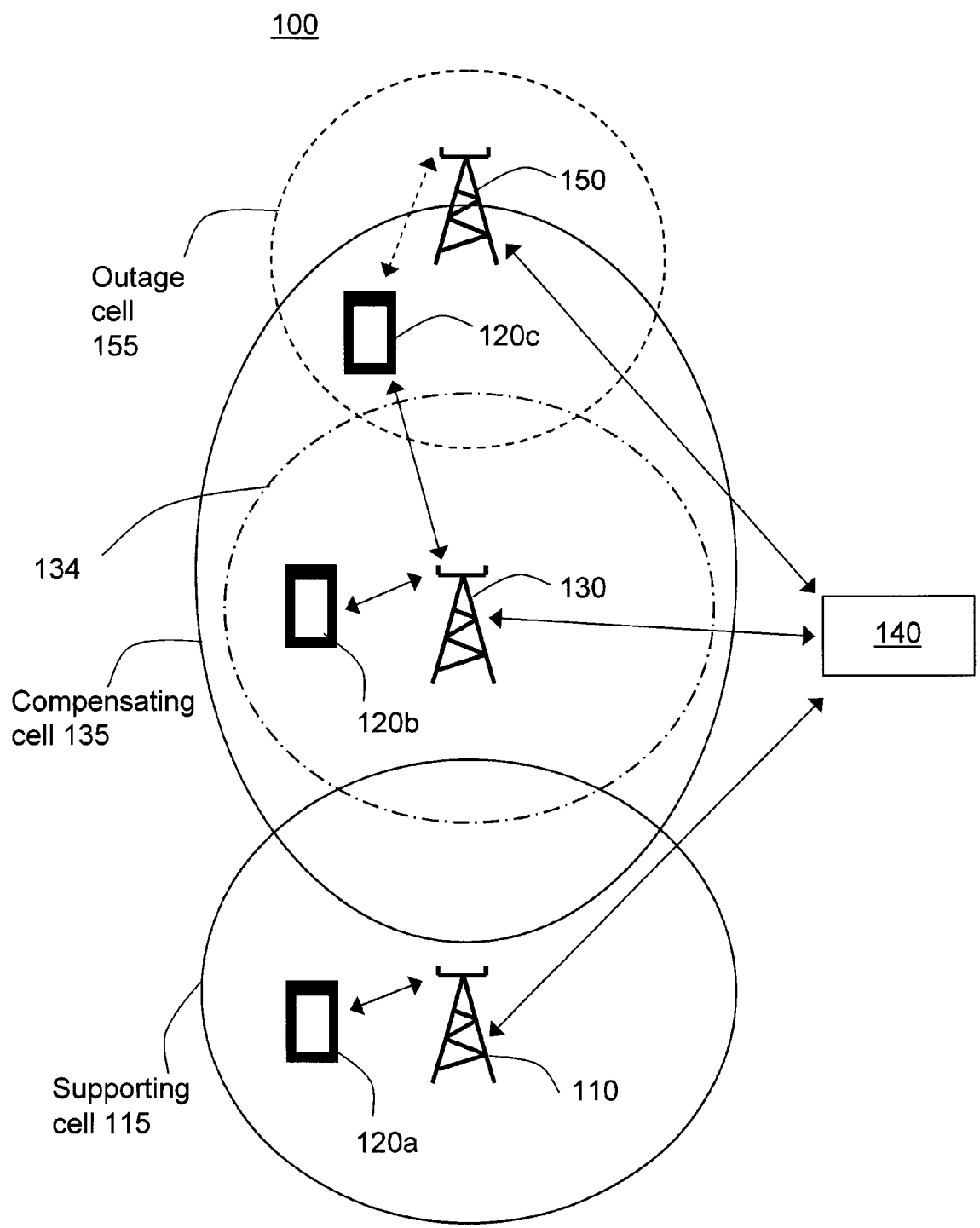
FIG. 2 is a schematic block diagram depicting another example of a cellular communications network.

FIG. 2 is a schematic block diagram depicting an example of a cellular communications network 100, according to embodiments herein. The cellular communications network may be an LTE cellular communication network and may comprise a radio access network and a core network (not explicitly indicated in FIG. 2). In an LTE-based or LTE-related system, the radio access network may correspond to what commonly is referred to as the Evolved UMTS Terrestrial Radio Access Network (E-UTRAN) and the core network may correspond to what commonly is referred to as the Evolved Packet Core (EPC). The shown radio communications system 100 comprises a supporting base station 110 serving a supporting cell 115 and a compensating base station 130 serving a compensating cell 135. FIG. 2 also shows an outage cell 155, i.e. a cell in outage. The supporting cell 115, the compensating cell 135 and the outage cell 155 may be a respective supporting cell, compensating cell and outage cell as described above and will be further explained below. The shown radio communications system 100 also comprises an outage base station 150, i.e. a base station that serves the outage cell 155 when activated, i.e. in non-outage. The outage cell 155 is drawn with a dashed line to represent the outage and that it, in the shown situation, is incapable of serving any user equipment. There is a dashed double arrow drawn between the outage base station 150 and a user equipment 120c, comprised in the cellular communications network 100, to also illustrate this incapability. The user equipment 120c is instead served by the compensating base station 130 in the compensating cell 135, thus compensating for the outage cell. The shown overlap between the outage cell 155 and the compensating cell 135 corresponds to the above-mentioned compensated area. An area 134 is drawn with a mixed dotted and dashed line to illustrate a normal coverage of the compensating cell, when it is not configured to compensate for the cell outage, i.e. in a situation with non-outage.

The shown base stations 110, 130 and 150 may be a respective eNB, or eNodeB, when the cellular communications network 100 is LTE based, but may in other embodiments be of another type and/or be referred to by different names, such as RBS, NodeB, BTS, depending on technology and terminology used.

The cellular communications network 100 shown in FIG. 2 further comprises user equipments 120a and 120b. The user equipment 120b is shown located in the compensating cell 135 in the area 134 and thus represent a user equipment that is served in the compensating cell 135 by the compensating base station 130, and would be so also in a situation of non-outage. The user equipment 120a is shown located in the supporting cell 115 and thus represent a user equipment that is served in the supporting cell 115 by the supporting base station 110.

The cellular communications network 100 may further comprise a management entity 140, as shown in FIG. 2. The management entity 140 is associated with the cellular communications network 100 and has knowledge of and is normally able to contact and communicate with base stations comprised therein, such as the supporting base station 110 and the compensating base station 130. In the shown situation with cell outage, depending on the underlying cause of the outage, the management entity 140 may still, or may not, be able to contact and communicate with the outage base station 150.

In some embodiments the management entity 140 may be integrated or located with a base station. The management entity 140 may as shown be shared between multiple base stations, however, in some embodiments (not shown) there may be one management entity per base station or several management entities, each shared by a group of base stations. In some embodiments compensating and supporting base stations may be associated with different management entities. In case of an LTE-based or related system, the management entity may be a device, for example a server, that implements functionality pertaining to what is referred to as Domain Management (DM) and/or Network Management System (NMS). The management entity 140 may also be referred to as an Operation and Maintenance (OaM) node.

As should be appreciated, the cell and base station naming "outage", "compensating" and "supporting" is for facilitating understanding in the context of embodiments herein and is in relation to a cell outage situation, such as described above. For example, in another situation of cell outage involving another cell or cells, but where the outage cell 155 and outage base station 150 are not in outage, the outage cell may be used as a compensating or supporting cell and the outage base station 150 may be used as a compensating or supporting base station.

It is again reminded that FIG. 2 is only schematic and for exemplifying purpose. The cellular communications network 100 may in reality comprise several further cells, base stations, user equipments, and other network nodes, including management entities, which are not shown here. Hence, the situation shown in FIG. 2 is not in every detail a prerequisite for all embodiments herein, as should be understood by the skilled person and from the below. For example, FIG. 2 only shows one cell in outage, one compensating cell and one supporting cell. However, in some embodiments there may be more than one cell that is in outage. In some embodiments there may be more than one compensating cell. In some embodiments there may be more than one supporting cell, for example more than one supporting cell for each compensating cell. The cellular communications network 100 may for example comprise multiple cells as shown in FIG. 1 and discussed above. In such case, the compensating cell 135 may e.g. correspond to compensating cell 7, and the supporting cell 115 may e.g. correspond to the supporting cell 21. "Compensating cell" and "supporting cell" and their relation will be further explained below.

Figure 3:
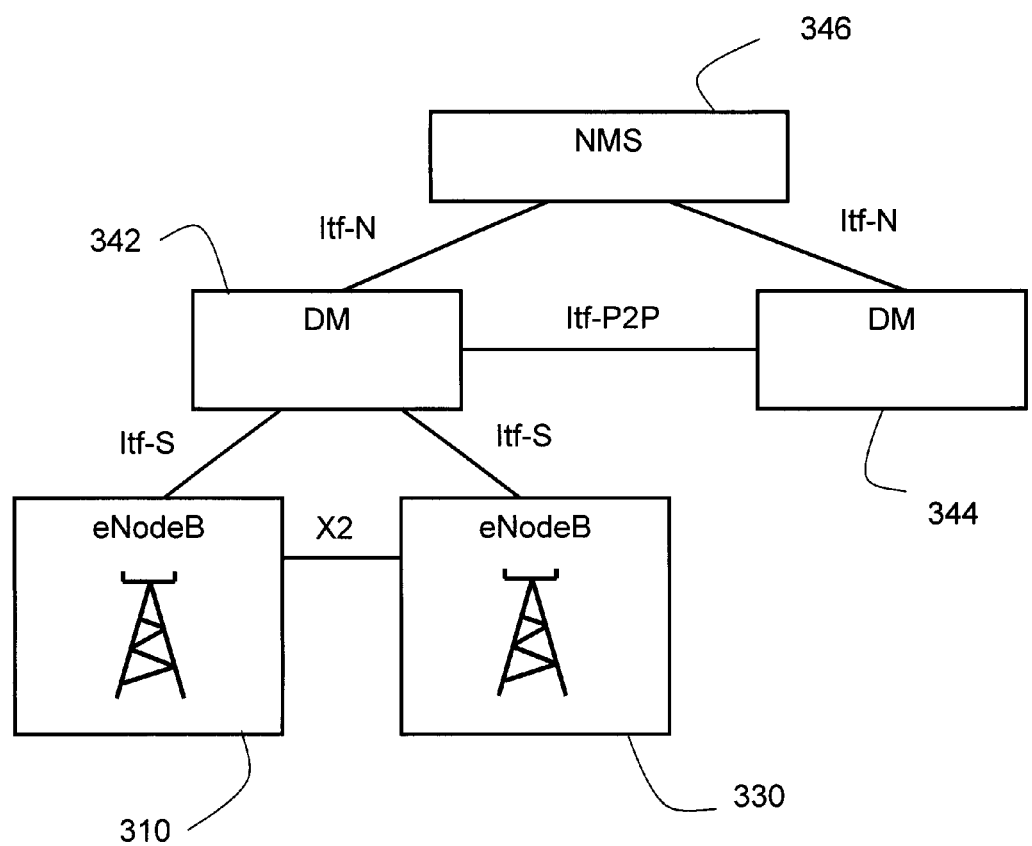
FIG. 3 is a schematic block diagram showing an LTE based example of a management system.

FIG. 3 is a schematic block diagram showing an LTE based example of a management system that may be used with embodiments herein and may be part of the cellular communications network 100 discussed in the foregoing. Two base stations 310, 330, are shown with a logical interface X2, used in LTE, for communication between the base stations 310, 330. The base stations may e.g. correspond to the base stations 110, 130 shown in FIG. 2. The base stations 310, 330 are managed by a Domain Manager (DM) 242, which may also be referred to and/or be part of an Operation and Support System (OSS). Also a second Domain Manager 344 is shown. The two DMs 342, 344 are in turn managed by a Network Management System (NMS) 346. An interface peer-to-peer (Itf-P2P) for communication between the DMs 342, 344 is also shown in the figure, as well as an interface North (Itf-N) for communication between the NMS 346 and respective DM 342, 344. One or more of the DMs and the NMS may correspond to the management entity 140 shown in FIG. 2. An interface between respective DM 342, 344 may be referred to as interface South (Itf-S).

As mentioned above, embodiments herein relates to resource scheduling utilizing a sub-band of a system bandwidth for uplink scheduling of resources for a compensating cell, where the sub-band is being used as a Low Interference Bandwidth (LIB). As should be recognized by the skilled person, by resource scheduling is in the present context meant scheduling of resources to be used in the uplink or downlink by one or more user equipments. A scheduled resource is then used to communicate data in the uplink or downlink, depending on the type of scheduled resource. By scheduling of resources in a cell is meant scheduling of resources to be used in the uplink or downlink for sending or receiving data to/from one or more user equipments being served in the cell. Each resource is associated with a frequency range and a time period. The time period may be referred to as a slot. Each resource may be referred to as a resource block. Resource block may sometimes be referred to as physical resource block. As also recognized by the skilled person, scheduling of resources comprises selecting from available resources and assigning the selected resources to the one or more user equipment. For example, by scheduling of a resource within the sub-band is thus meant selecting a resource that is associated with a frequency range that is within the sub-band and assigning the selected resource to a user equipment. In the case of LTE, scheduling of resources in both the downlink and the uplink is performed in a so called scheduler situated in the eNodeB, that is, in the respective base station. However, in other type of cellular communications network 100 that may be relevant for embodiments herein, the scheduling of resources may take part elsewhere, e.g. in the management entity 140 or similar. Note that also in the case of LTE, the management entity 140 may affect or even, at least in part, indirectly control the scheduling behaviour.

Some Radio Access Technologies (RATs), for example E-UTRAN in case of LTE, and UTRAN, support dynamic scheduling of uplink and/or downlink resources. Resources are then scheduled according to momentary traffic demand, Quality of Service (QoS) requirements, and estimated channel quality. Based on this an eNB may schedule resources to UEs with e.g. higher channel quality. In E-UTRAN, the smallest schedulable entity is called a Scheduling Block (SB), consisting of two, in time, consecutive Resource Blocks (RBs), and have a total length of 1 ms, referred to as a subframe, and width of 180 kHz. Each RB thus has a length of 0.5 ms, referred to as a slot, and a bandwidth of 180 kHz. During scheduling, an eNB, or rather the scheduler situated in the eNB, allocates SBs to UEs being served, both in time and frequency. In E-UTRAN, a UE may be configured to report Channel Quality Indicator (CQI) reports, indicating the quality of the DL. Based on the CQI reports and QoS requirements, the scheduler may assign SBs to the UE.

Figure 4:
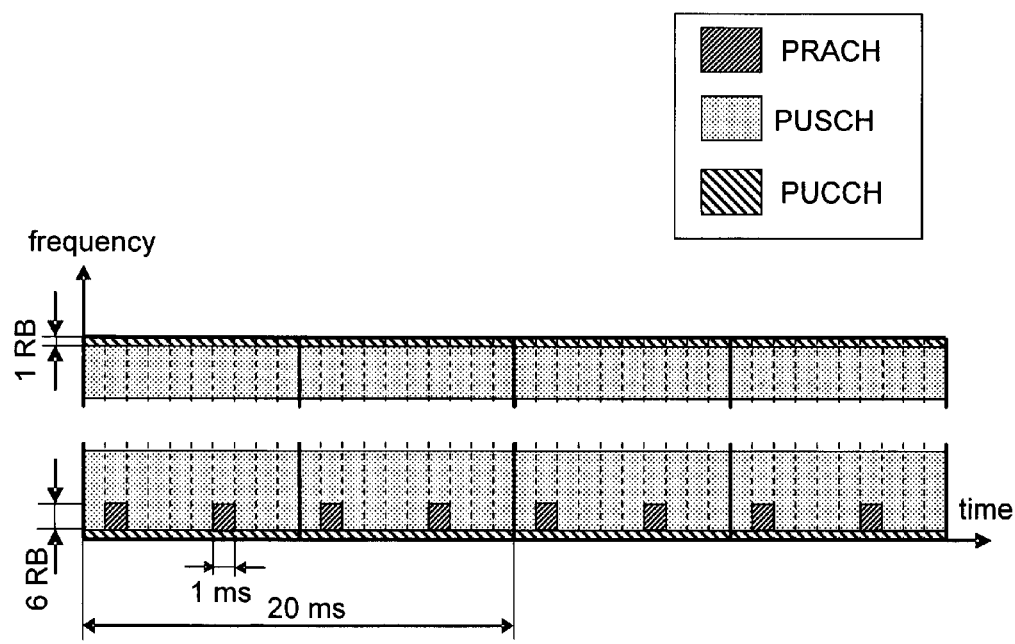
FIG. 4 is a diagram schematically illustrating a typical example from LTE of a time-frequency structure in the uplink.

FIG. 4 is a diagram schematically illustrating a typical example from LTE of a time-frequency structure with scheduled resources in the uplink. The example relates to a situation with non-synchronized Random Access (RA) for Frequency Division Duplex (FDD). Note that the resources are shown grouped for different type of channels, not per user equipment. The channels are known in LTE and referred to as the Physical Uplink Shared CHannel (PUSCH), Physical Uplink Control CHannel (PUCCH) and Physical Random Access CHannel (PRACH). The PUSCH is shared between user equipments being served in the cell and is used for uplink user data. Resources are scheduled in the PUSCH taking into account the need of individual user equipments. The need may be communicated from the user equipment to the eNB in the form of scheduling requests using the PUCCH. As shown, the PUCCH is located at frequency band edges, it is not transmitted simultaneously as the PUSCH and allocates a bandwidth of 180 kHz (1 RB). In the shown example, there is allocated RA opportunities in the PRACH, each opportunity involving 6, in frequency, consecutive RBs. The bandwidth of a RA opportunity is thus 1.08 MHz (6 RBs). The effective bandwidth utilized by a RA preamble is 1.05 MHz, leaving small spectral guard bands on each side. This since RA and regular uplink data are separated in frequency-domain but are not completely orthogonal. FIG. 4 illustrates a TDMA/FDMA structure of the RA opportunities in Frequency Division Duplex (FDD), where only one 1.08 MHz band is allocated to RA at each time. However, in case of Time Division Duplex (TDD), several bands are possible. The PRACH in LTE, or corresponding channel in another type of cellular communications networks, is i.a. used by each user equipment to signal its presence and for setting up a connection for communicating user data. If a UE is not able to communicate over PRACH, there will be no connection set up for communicating data, no services available to the UE etc. If a user equipment cannot use the PRACH because of interference it does not matter if there is less or no interference in another frequency band, the UE will never get connected and thus not be able to get any resources scheduled in that frequency band. Hence, in the context of the present disclosure, it may be considered of particular interest that the PRACH is available in the compensating cell 135.

Figure 5:
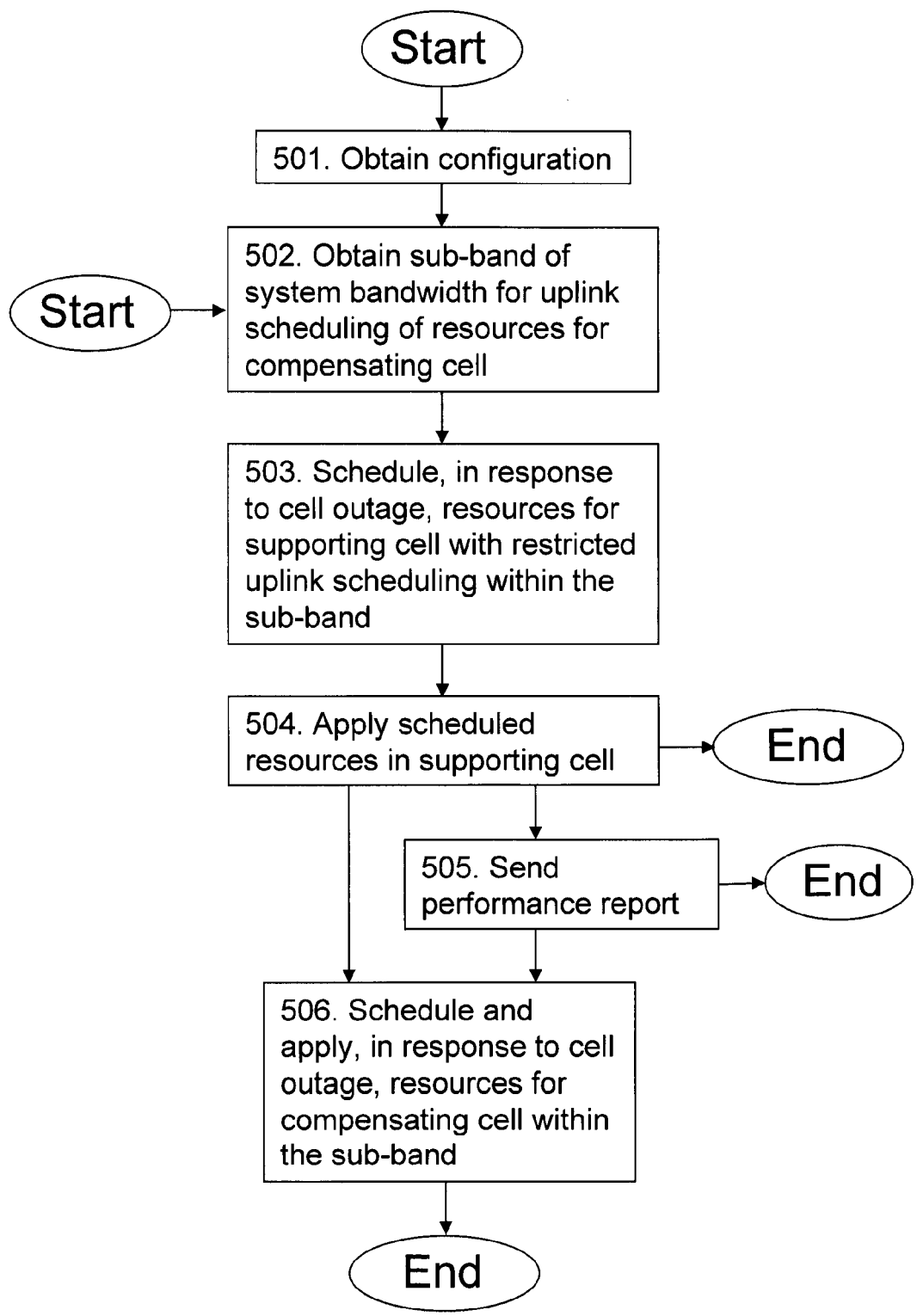
FIG. 5 is a flow chart illustrating a method in a network node according to embodiments herein.

Embodiments herein relating to a method in the network node 110, 140 for supporting compensation of cell outage in the cellular communications network 100, will now be further elaborated and described with reference to the flowchart depicted in FIG. 5. In some embodiments the network node is the management entity 140, in other embodiments it is the supporting base station 110. Although not elaborated further in the following, there may be embodiments where the method is in another node in the network, such as the in the compensating base station 130, or another base station in the cellular communications network 100. When actions of the method are discussed below, it will in particular be discussed implications for the embodiments where the network node is the management entity 140 and supporting base station 130, which are embodiments that may be of most practical interest. The cellular communications network 100 comprises the network node 110, 140, the compensating cell 135 for compensating the cell outage and the supporting cell 115 neighbouring the compensating cell 135. The method comprises the following actions, which actions may be taken in any suitable order. Further, actions may be combined.

Action 501

This is an optional action for embodiments herein. The network node 110, 140 obtains a configuration for configuring behavior of the network node during the cell outage. The configuration may be obtained by being received from another network node.

In some embodiments, where the network node is the supporting base station 110 for serving the supporting cell 115, the configuration is received from another network node, typically the management entity 140. The configuration is then configuring behavior of the supporting base station for serving the supporting cell during the cell outage. This situation and the configuration will be further discussed below.

Action 502

The network node 110, 140 obtains a sub-band of a system bandwidth for uplink scheduling of resources for the compensating cell 135. The sub-band may herein also be referred to as a Low Interference Bandwidth (LIB). As realized by the skilled person, the sub-band is thus a frequency range that is a part or portion of the system bandwidth but not the complete system bandwidth. The system bandwidth for uplink scheduling of resources here refers to the total allocated bandwidth for uplink scheduling in the compensating cell. It is typically the same system bandwidth for uplink scheduling in the supporting cell 115 and typically in the whole cellular communications network 100, but in some embodiments there may be different system bandwidths for different cells. The LIB may be obtained as a range of values, e.g. represented by a max and min value, or center value and width value.

In general the sub-band may be obtained according to the present action by being received from another network node and/or by being determined within the network node as such, e.g. computed based on an algorithm.

In embodiments where the network node is the supporting base station 110, the sub-band may be obtained by being received from another network node, for example the management entity 140 or the compensating base station 130, and/or it may be obtained by being, wholly or partly, determined in the supporting base station 110 as such, e.g. computed based on an algorithm.

In embodiments where the network node is the management entity 140, the sub-band may as well be obtained by being received from another network node. However, more likely it may be obtained by being, wholly or partly, determined in the management entity 140, e.g. computed based on an algorithm.

The sub-band is typically obtained in response to the cell outage, however this may not be the case for all embodiments. In some embodiments, the sub-band may instead be obtained prior to the cell outage, for example in case of a fix sub-band that is predetermined to be used in case of cell outage. Information about the cell outage may be received by the network node 110, 140 from another network node in the cellular communications network 100. In some embodiments, the network node may itself come to an conclusion about occurrence of the cell outage based on information, or non-occurrence of expected information, from another network node. Said another network node may be the outage base station 150, which may be operable to some extent, although not able to serve any user equipments in the outage cell 155. For example, in case of LTE, the outage base station 150 may be an eNB still able to communicate over the X2 interface with one or more of the supporting base station 110, the compensating base station 130 and the management entity 140. Signaling in case of cell outage and that may be used with embodiments herein will be further discussed separately below.

In some embodiments the supporting cell 115 is one of multiple supporting cells that are comprised in the cellular communication network 100. The sub-band may be the same for the multiple supporting cells. For example, if the supporting cell 115 corresponds to cell in FIG. 1, and as discussed in the foregoing, the multiple supporting cells may be cells 10, 11, 15, 16, 20 and 21. The supporting cell 115 will be further explained below.

In some embodiments, the sub-band has a size that is determined based on an estimated radio coverage loss resulting from the cell outage. If a user equipment is predicted to be served in the compensating cell 135 from longer distance with higher path loss than if it would be served in the outage cell 155, and if the interference situation may be predicted, a needed sub-band size to meet a desired quality of service may be determined.

Further, the sub-band may have a size that is determined so that at least support for some basic service is enabled for one or more user equipments, such as the user equipment 120*c*, being served in the compensating cell 135 in the geographical area where that user equipment before the cell outage would have been served in the outage cell 155. Or in other words, using the term compensated area introduced above, the sub-band may have a size that is determined so that at least support for some basic service is enabled for one or more user equipments in the compensated area.

In some embodiments, the sub-band comprises the PRACH of the compensating cell 135.

In a first group of embodiments, the sub-band is obtained, typically computed, based on one or more of the following parameters:

One or more observed uplink and downlink quality indicators associated with the supporting cell 115 and/or one or more other supporting cells that also are comprised in the cellular communication network and neighbouring the compensating cell 135.

A respective threshold value for target downlink quality and target uplink quality.

A minimum sub-band and/or a maximum sub-band.

Figure 6:
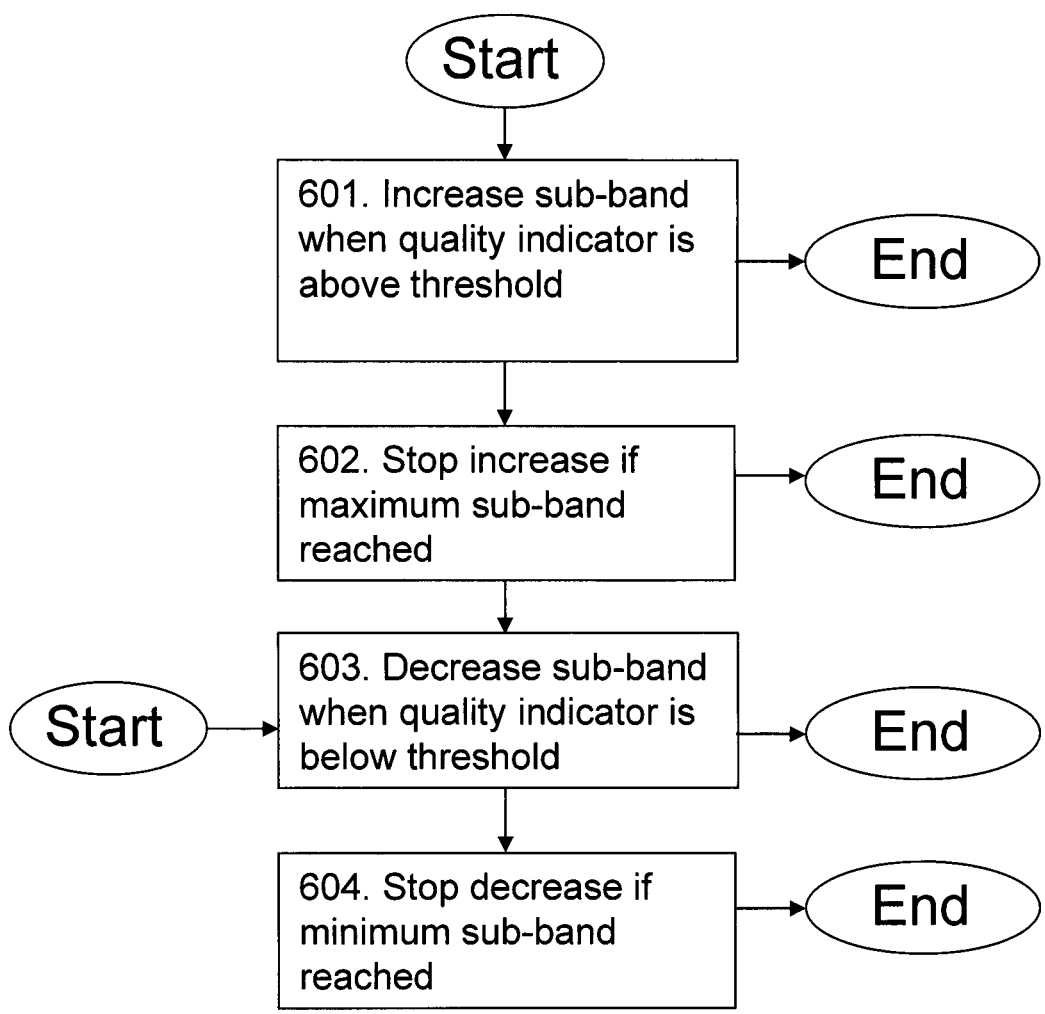
FIG. 6 is a flow chart illustrating further actions of the method in the network node according to a first group of embodiments.

The first group of embodiments will be described and discussed in further detail below, in connection with FIGS. 6-7, and with support from a first more detailed example.

Figure 8:
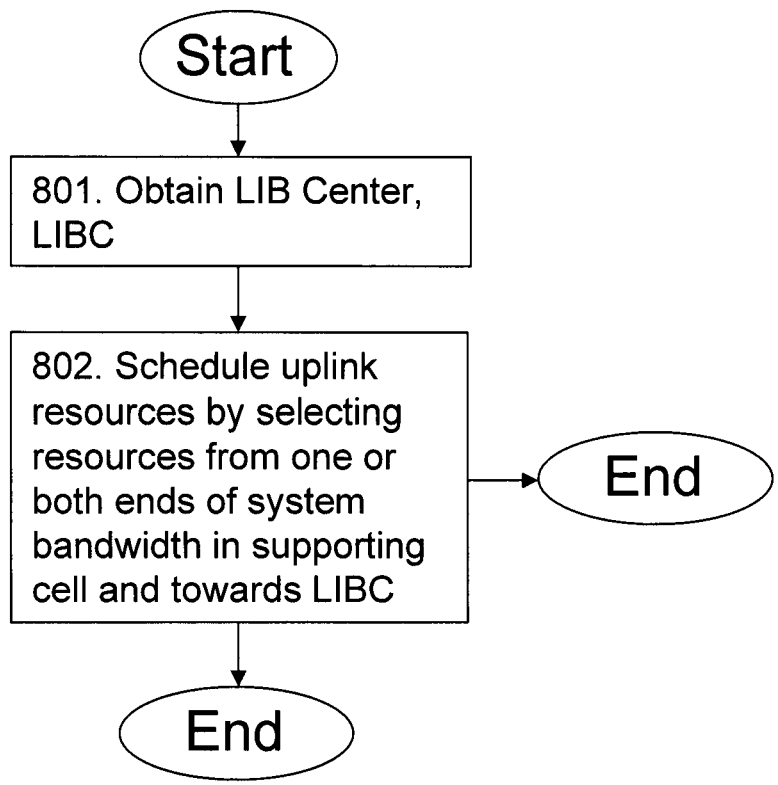
FIG. 8 is a flow chart illustrating further actions of the method in the network node according to embodiments herein.

How the sub-band is obtained according to a second group of embodiments will be described and discussed in further detail below, in connection with FIGS. 8-9.

Action 503

The network node 110, 140 schedules, in response to the cell outage, resources for the supporting cell 115 with restricted uplink scheduling within the sub-band.

In some embodiments, the restricted uplink scheduling within the sub-band is restricted by deliberately avoiding scheduling any, or at least some, resources within the sub-band for the supporting cell 115.

In some embodiments, resources may, as an exception, be scheduled within the sub-band for the supporting cell 115 when there is need for scheduling of more resources than are available outside the sub-band for the supporting cell 115.

Further, in some embodiments, resources may, as an exception, be scheduled within the sub-band for the supporting cell 115 regarding a user equipment, for example the user equipment 120*a*, if the user equipment has a high path loss to the compensating cell 135 and thereby is expected to generate low uplink inter-cell interference in the compensating cell 135. The skilled person will, in a given practical situation, be able to determine how high the path loss may be for the exception to be acceptable. The user equipment that has the high path loss and is allowed to be scheduled within the sub-band may be identified using UE reports, for example from Reference Signal Received Power (RSRP) measurements.

In some embodiments, the resources being scheduled within the sub-band are selected from one or both ends of the sub-band, thereby leaving an inner region thereof without scheduled resources. This will be described and discussed in further detail below in connection with FIG. 10.

In some embodiments, the resources being scheduled within the sub-band are randomly selected within the sub-band.

In case of LTE and embodiments where the network node is the supporting base station 110, scheduling in the supporting cell 115 including scheduling relating to the present action may be carried out by the supporting base station 110, in particular by the aforementioned scheduler thereof. However, as realized by the skilled person, the scheduling may still in part be influenced or even controlled by another network node, such as the management entity 140. An example of this is in case the sub-band in the previous action was received from the management entity 140, which thus influence the scheduling by the restricted use of the sub-band.

Action 504

The network node 110, 140 applies the scheduled resources in the supporting cell 115. The supporting cell will thereby cause less interference within the sub-band in the compensating cell 135, since uplink scheduling was restricted within the sub-band. This thus explains the above-mentioned naming Low Interference Bandwidth (LIB) for the sub-band, Said less interference within the sub-band in the compensating cell 135 means that a higher Signal to Interference and Noise Ratio (SINR) is enabled in the uplink for user equipments served in the compensating cell 135, such as the user equipment 120*b* and 120*c*, if these are scheduled within sub-band. The higher SINR being enabled is particular advantageous for a user equipment being served in the compensating cell 135 in the geographical area where the user equipment before the cell outage would have been served in the outage cell 155, such as the user equipment 120*c*. Or in other words, using the term compensated area introduced above, the higher SINR being enabled is particular advantageous for user equipments being served by in the compensating cell 135 in the compensated area of the outage cell 155. This since the compensated area is so remote from the compensating base station 130 that a user equipment located in the compensated area is only able to reach the compensating base station 130 with signals weaker than normally received by the compensating base station 130, i.e. weaker than in a non-outage situation. As recognized by the skilled person, higher SINR makes it possible serve a user equipment using weaker signals, for example the user equipment 120*c*. The higher SINR being enabled may e.g. be utilized to let the compensating cell 135 cover a larger area of the outage cell 155 than else would be possible, and/or to serve user equipments located therein with improved performance. Hence, embodiments herein enable improved serving of the user equipment 120*c* in the compensating cell 135 in the compensated area of the outage cell 155. Hence embodiments herein support improved compensation of cell outage.

Note that, as realized by the skilled person, the scheduled resources may be applied in the supporting cell 115 differently depending on if the network node is the supporting base station 110 or the management entity 140.

In case of embodiments where the network node is the supporting base station 110, the supporting base station 110 may apply the scheduled resources in the supporting cell 115 by sending information regarding relevant scheduled resources to one or more UEs being served, for example the user equipment 120*a*. In LTE this may be accomplished by sending information regarding respective scheduled resources to each UE that has requested resources. In response thereto, the respective UE will transmit in the uplink using its scheduled resources.

In case of embodiments where the network node is the management entity 140, the scheduled resources may be applied in the supporting cell 115 by sending information about the scheduled resources and a command to the supporting base station 110. The command commanding the supporting base station 110 to send information regarding relevant scheduled resources to one or more UEs being served, for example the user equipments 120b and 120c. The result from this is then same as accounted for above, i.e. that the respective UE will transmit in the uplink using its scheduled resources.

Action 505

This is an optional action for embodiments herein. The network node 110, 140 sends a performance report, regarding serving of the supporting cell 115 with the restricted uplink scheduling within the sub-band, to another network node. In some embodiments, where the network node is the supporting base station 110 for serving the supporting cell 115, the performance report is sent to the management entity 140. This situation and the performance report will be further discussed below.

Action 506

This action is optional for embodiments herein. The network node 110, 140 schedules, in response to the cell outage, resources and applies the scheduled resources for the compensating cell 135. This is done within the sub-band for one or more user equipments, such as user equipment 120c. Said one or more user equipments may be in a geographical area where said one or more user equipments before the outage would have been served in the outage cell 155. Or in other words, using the term compensated area introduced above, for one or more user equipments, such as the user equipment 120c, served in the compensated area.

In case of LTE, as already mentioned, scheduling is typically carried out in respective base station, in particular by the scheduler thereof. Hence, in case of LTE, scheduling of resources for the compensating cell 135 and for the supporting cell 115, will typically not take place in the same network node, although possible, e.g. in case of a base station serving separate sectors, a so called sectorized base station. Hence the present action, since it is part of a method in one and the same network node, may not always be relevant for LTE. However, it is of course still advantageous to combine embodiments herein for which the network node is the supporting base station 110 with scheduling of resources for the compensating cell 135 within the sub-band, although not carried out in the same network node. In fact, without applying embodiments herein, there may be no particular benefit from scheduling resources within the sub-band for the compensating cell. Hence, embodiments herein support, but may require additional measure to result in, improved compensation of cell outage.

In case of embodiments where the network node is the management entity 140, the present action may, mutatis mutandis, as realized by the skilled person, be carried out relative the compensating base station 120 in a corresponding manner as described above regarding scheduling of and application of scheduled resources relative the supporting base station 110.

The above mentioned first group of embodiments will now be described and discussed in further detail, with support from FIGS. 6-7 and the first more detailed example. As should be readily understood, the first group of embodiments relate in particular to Action 502 described above. The first group of embodiments is thus part of the embodiments herein relating to the method, as described above in connection with FIG. 4. Moreover, embodiments in the first group of embodiments are optional, and will be further elaborated and described with reference to the flowchart depicted in FIG. 6. Hence, action 502, described above, may comprise one or more of the following actions, which actions may be taken in any suitable order. Further, actions may be combined.

Action 601

The network node 110, 140 may increase a previously obtained sub-band when at least one of the one or more observed uplink and downlink quality indicators is above the respective threshold value for target downlink quality and target uplink quality. The previously obtained sub-band may for example, at least initially, be a predetermined sub-band, such as the minimum sub-band, or may be obtained according some other embodiments herein. An increased previously obtained sub-band may then be used as a new previously obtained sub-band etc. This way the sub-band may be automatically increased, e.g. incrementally, based on said quality indicators and threshold values, so that quality requirements are met. Examples of what may constitute the quality indicators and threshold values follow below in the first more detailed example.

Action 602

The network node 110, 140 may stop the increase when the maximum sub-band is reached. By preventing too much increase, it may be ensured that there always will some bandwidth left in the supporting cell for serving user equipments.

Action 603

The network node 110, 140 may decrease a previously obtained sub-band when at least one the observed uplink and downlink quality indicators is below the respective threshold value for target downlink quality and target uplink quality. The previously obtained sub-band may for example, at least initially, be a predetermined sub-band, such as the maximum sub-band, or may be obtained according some other embodiments herein. An increased previously obtained sub-band may then be used as a new previously obtained sub-band etc. This way the sub-band may be automatically decreased, e.g. incrementally, based on said quality indicators and threshold values. In combination with e.g. Action 601, it is thus possible to automatically adjust the sub-band by decreasing and/or increasing so that a target quality is met in the uplink and/or the downlink.

Action 604

The network node 110, 140 may stop the decrease when the minimum sub-band is reached. This way it may be ensured that there always be some sub-band that is beneficial for serving one or more user equipment in the compensating cell 135, in particular in the compensated area of the outage cell 155. The minimum sub-band should typically be sufficiently large to overlap PRACH and/or so that at least basic services, e.g., voice and/or low data rate etc may be supported for the one or more user equipment being served in the compensating cell 135.

Figure 7:
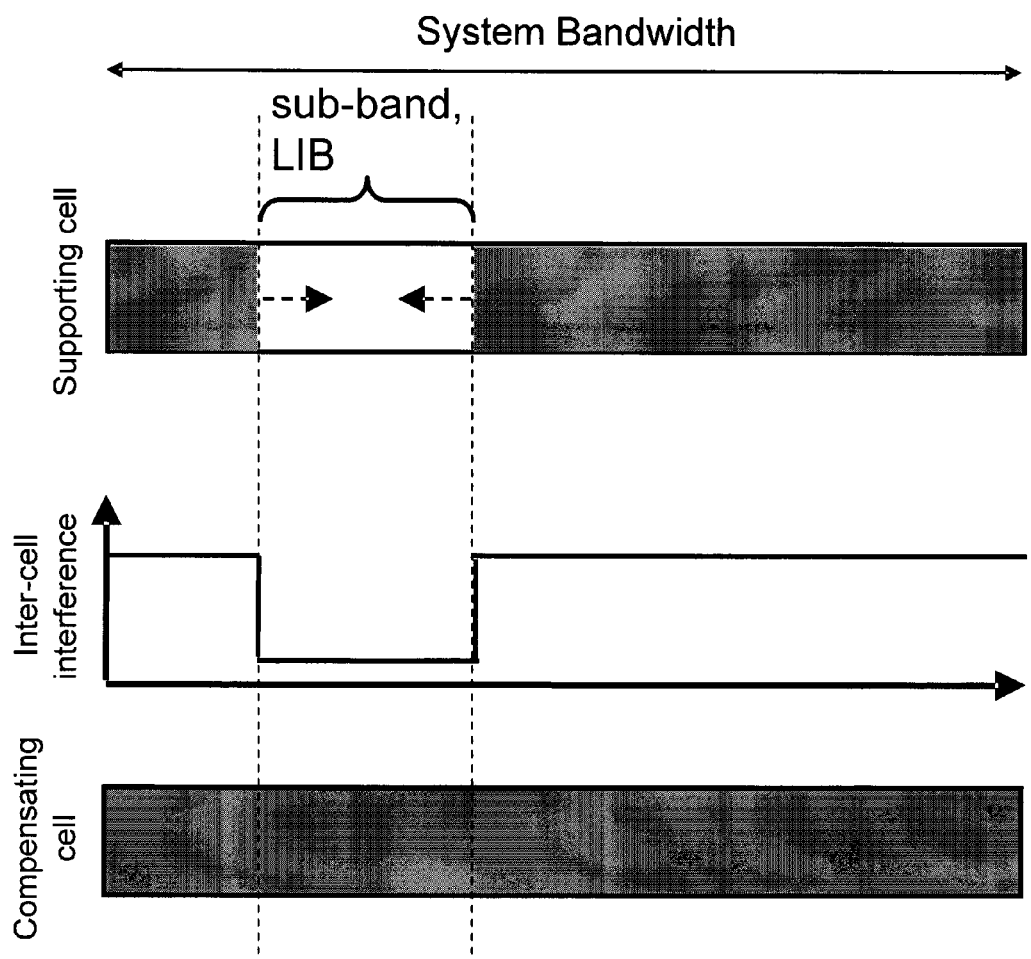
FIG. 7 schematically illustrates an example of how a sub-band being a Low Interference Bandwidth, LIB, according to embodiments herein may relate to the system bandwidth in a supporting cell.

FIG. 7 schematically illustrates how the sub-band, i.e. the Low Interference Bandwidth (LIB), may relate to the system bandwidth in a supporting cell, in a compensating cell and to inter-cell interference caused by the supporting cell in the compensating cell. The supporting cell may e.g. be the supporting cell 115 and the compensating cell may be the compensating cell 135.

In the sub-band area indicated in the supporting cell, see (a) in FIG. 7, there may not be scheduled any UEs. This implies a lower inter-cell interference within the sub-band for the compensating cell, see (b) in FIG. 7. The compensating cell may, however, schedule UEs within the sub-band, see (c) in FIG. 7. In particular, the compensating cell may choose to schedule UEs with poor signal quality, such as UEs that normally, i.e. in a non-outage situation, would be served in an outage cell, within the sub-band. A lower inter-cell interference over sub-band results in an increased uplink SINR for UEs scheduled within the sub-band in the compensating cell. The increased SINR increases the ability to cover UEs that normally would be served in the outage cell.

The first more detailed example will now follow.

By increasing sub-band, the available resources for scheduling in the supporting cell decreases and this results in lower quality in the supporting cell. Similarly, by increasing sub-band, the inter-cell interference decreases for the compensating cell and thereby it is enabled increased coverage of the outage cell, as discussed above. Hence, balancing between coverage provided by the compensating cell and quality in the supporting cells may be desirable. This balancing may be achieved by means of the above mentioned target quality etc. Each cell in a vicinity of the outage cell may continuously measure and provide the aforementioned uplink and/or downlink quality indicators, e.g., $10^{th}$-percentile of the DL and UL throughput, or fulfillment of a negotiated service quality. Similarly as discussed above, the size of sub-band may then be adjusted such that the respective quality indicator is equal to or above a certain threshold, corresponding to the threshold value for target downlink quality and target uplink quality. Such threshold may also be referred to as outage target quality. In case of negotiated services, the outage target quality may be either complete fulfillment of the negotiated service quality or a fraction of the services.

Let $Q_{DL}$ and $Q_{UL}$ denote the quality in the DL and UL, respectively, which may correspond to the previously introduced observed uplink quality indicator and observed downlink quality indicator respectively. As an example, it may be assumed that each cell has an outage target quality $Q_{T,DL}$ for DL and $Q_{T,UL}$ for UL, which may be defined in terms of UE throughput, e.g. $10^{th}$-percentile UE throughput or fulfillment of the negotiated service quality. The following may be desirable an outage: $Q_{DL} \geq Q_{T,DL}$ and $Q_{DL} \geq Q_{T,UL}$. The coverage may be maximized under the constraints that a quality indicator is greater or equal to the outage target quality. UL quality and DL quality may be continuously measured in the supporting cell, or in each supporting cell in case of multiple supporting cells as also discussed previously. The sub-band may then be increased under the constraint that $Q_{DL} > Q_{T,DL}$ and $Q_{UL} > Q_{T,UL}$. Clearly, there are several ways of setting the sub-band, i.e. the Low Interference Bandwidth (LIB) such that above specified constraint is satisfied. One example is according to the following algorithm, described in pseudo-code:

```
If Q_DL > Q_T,DL AND Q_UL > Q_T,UL then
    LIB(k) = min(LIB_max,LIB(k-1) + d)
else
    LIB(k) = max(LIB_min,LIB(k-1) - d),
``` where d may be a step by which the sub-band, i.e. the LIB, is decreased or increased. As should be realized, $LIB_{max}$ is the maximum sub-band and $LIB_{min}$ is the minimum sub-band, as discussed above.

The above mentioned second group of embodiments will now be described and discussed in further detail, with support from FIGS. 8-9. The second group of embodiments is part of the embodiments herein relating to the method, as described above in connection with FIG. 5. Moreover, embodiments in the second group of embodiments are optional, and will be further elaborated and described with reference to the flowchart depicted in FIG. 8. Hence, the method described above in connection with FIG. 5, may further comprise the following actions, which actions may be taken in any suitable order. Further, actions may be combined.

Action 801

The network node 110, 140 may obtain a LIB Center (LIBC) to be comprised in the sub-band. The LIBC may be obtained similarly as described for obtaining the sub-band in Action 502 above.

The LIBC may be obtained within a PRACH of the compensating cell 135. Reason for this is the same as obtaining the sub-band to comprise the PRACH as described above in Action 502, and will be further discussed below.

Action 802

The network node 110, 140 may schedule the uplink resources for the supporting cell 115 by selecting resources from one or both ends of a system bandwidth of the supporting cell 115 and gradually towards the LIBC. That is, the uplink resources that are scheduled for the supporting cell 115, as described above in Action 501, here comprises to select resources from one or both ends of a system bandwidth of the supporting cell 115 and gradually towards the LIBC. Thereby the sub-band is obtained as a bandwidth adjoining the LIBC and with the restricted uplink scheduling within the sub-band.

Similarly as described above in Action 503, resources may, as an exception, be scheduled in the vicinity of the LIBC, and thus may be within the sub-band, for the supporting cell 115 regarding a user equipment, for example the user equipment 120a, if the user equipment 120a has a high path loss to the compensating cell 135.

The user equipment that has the high path loss and is allowed to be scheduled in the vicinity of LIBC may be identified using UE reports, for example with RSRP measurements.

Figure 9:
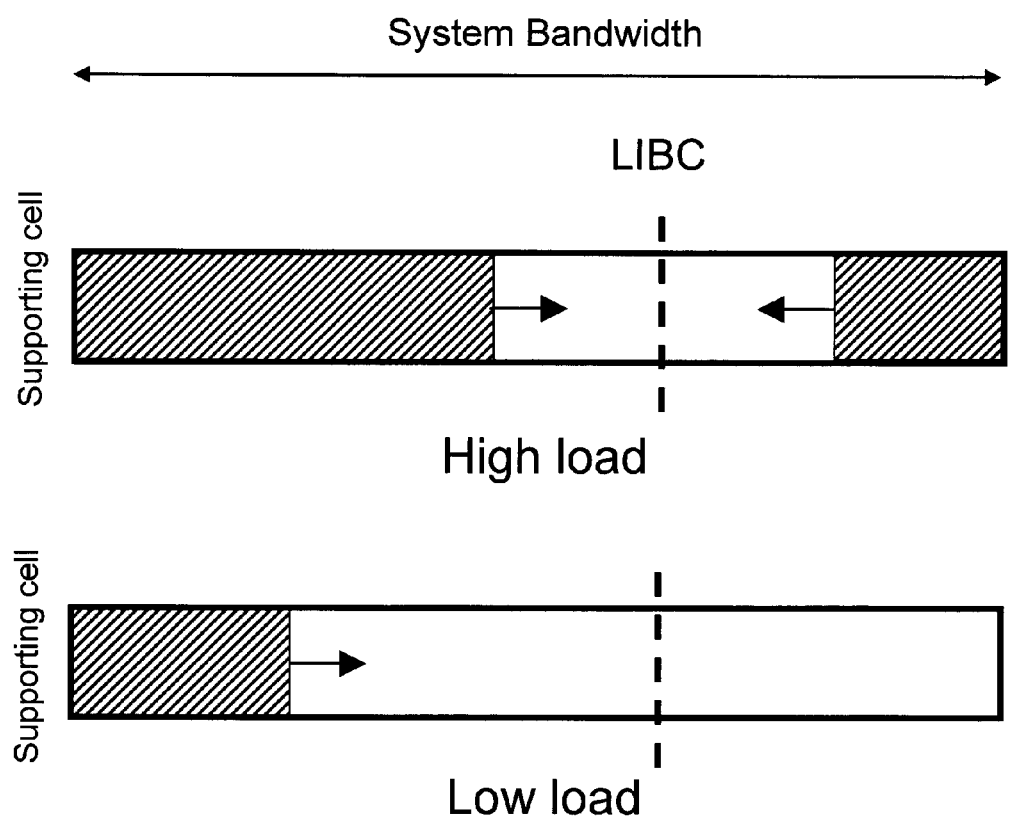
FIG. 9 schematically illustrates another example of how the LIB may relate to the system bandwidth in a supporting cell.

FIG. 9 schematically illustrates how the sub-band, represented by the white area, may relate to the system bandwidth in a supporting cell when the LIB is obtained based on the LIBC, as described above in connection with FIG. 8. The supporting cell may e.g. be the supporting cell 115. The upper part shows the case when the load is high in the supporting cell, whereas the lower figure shows when the load is low in the supporting cell. By load is here referred to how many resources are being scheduled in the uplink.

Figure 10:
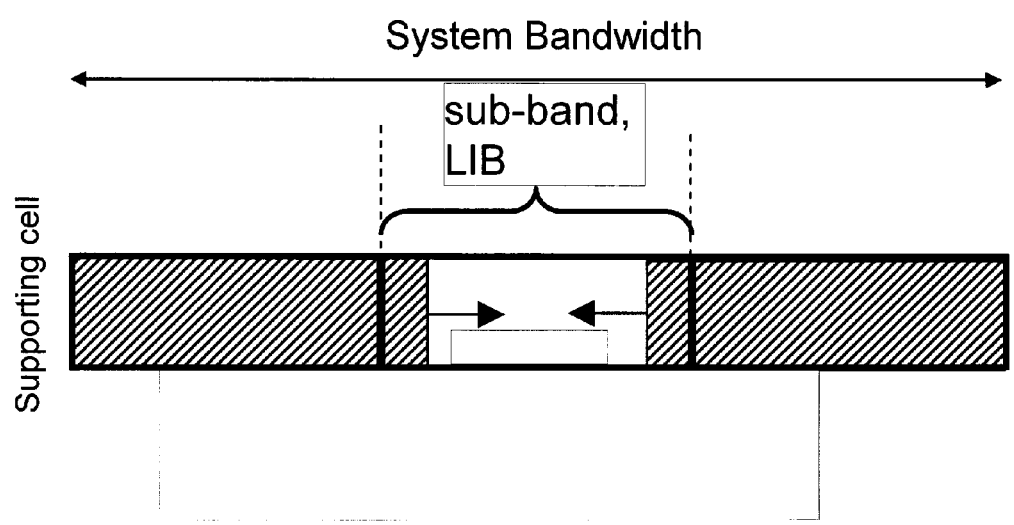
FIG. 10 schematically illustrates yet another example of how the LIB may relate to the system bandwidth in a supporting cell.

FIG. 10 schematically illustrates how the sub-band may relate to the system bandwidth in a supporting cell when there is allowed exceptions with resources scheduled within the sub-band, such as described above for Action 503. The supporting cell may e.g. be the supporting cell 115. In the shown example the resources being scheduled within the sub-band are selected from both ends of the sub-band, thereby leaving an inner region thereof without scheduled resources.

As already mentioned above in connection with FIG. 4, it is desirable, or even crucial, that the PRACH is available and this may be prioritized. In order to reduce the UL inter-cell interference in the PRACH, the sub-band may be placed over a frequency bandwidth where PRACH is located, i.e. the sub-band is obtained to comprise the PRACH as mentioned above in connection with Action 502. The width of the sub-band should thus cover the width of the frequencies assigned for PRACH. Similarly, LIBC may be located at the center of PRACH, or in the vicinity of the LIBC as mentioned above in connection with Action 802. As a result, no data may e.g. be scheduled in the supporting cell 115 in the same frequency band as PRACH of the compensating cell 135, but PRACH of the supporting cell, which may be located at the same location as the PRACH of the compensating cell 135, may still interfere. However, an orthogonal time and/or frequency allocation may be chosen between the compensating cell 115 and the supporting cell 135. In other words, an overlap of PRACH between the compensating cell 135 and the supporting 115 cell may be avoided by time multiplexing and/or frequency multiplexing.

Figure 11:
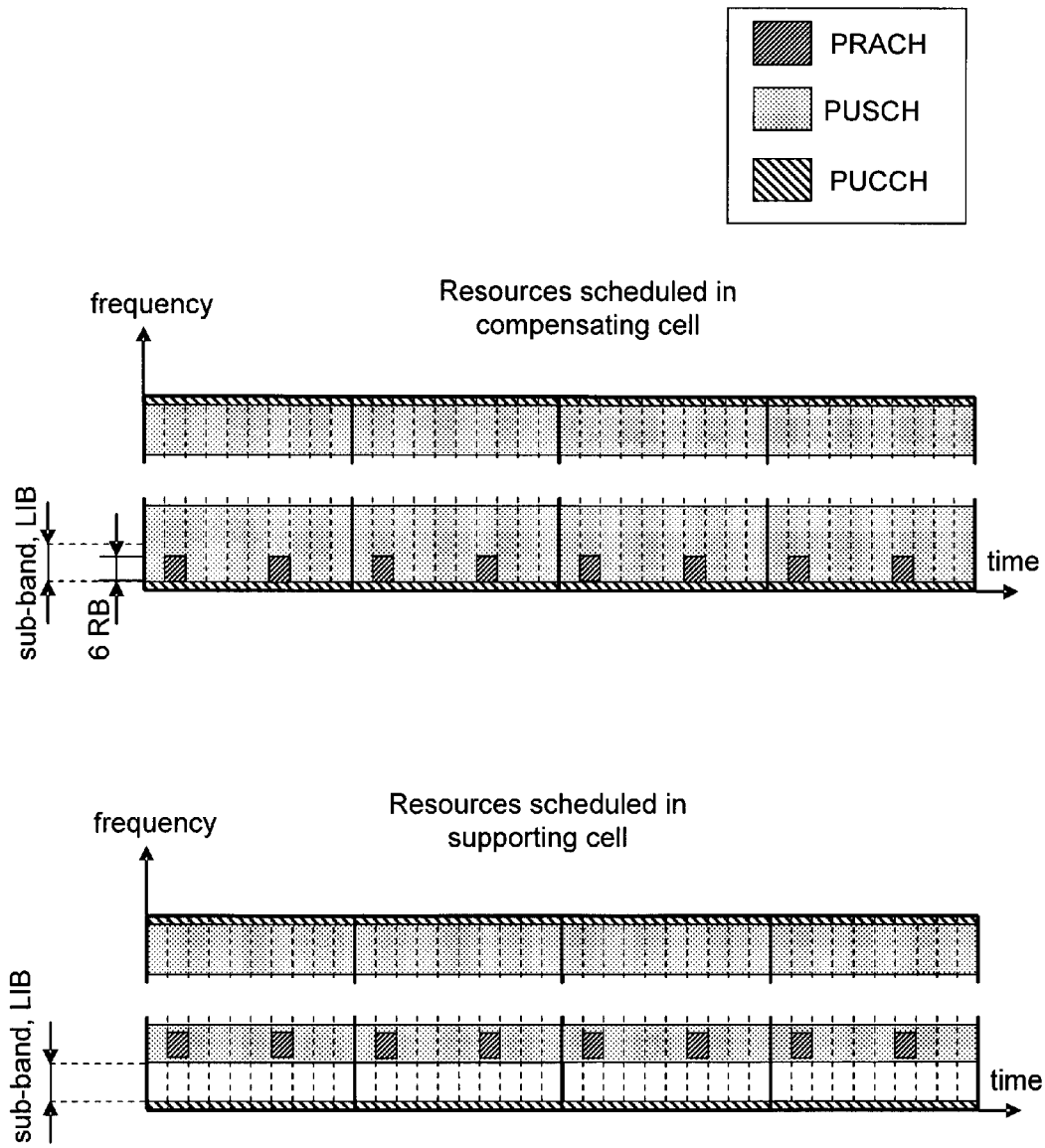
FIG. 11 are diagrams schematically illustrating an example of uplink time-frequency structure in the uplink when the LIB is used.

FIG. 11, which may be compared with FIG. 4 discussed above, are diagrams schematically illustrating an example of uplink time-frequency structure with scheduled resources in the uplink. In the shown example the sub-band has been obtained to comprise the PRACH of a compensating cell, see upper diagram, which may be the compensating cell 135. The sub-band is shown slightly wider than the 6 RB wide PRACH. The same sub-band is also shown located in the lower diagram regarding a supporting cell. However, here the PRACH of the supporting cell has been moved to another frequency band and thus the PRACH of the supporting cell will not interfere with the PRACH of the compensating cell. This is illustrated by the non-filled empty band (represented by white color) corresponding to the sub-band in the lower diagram. However, in another situation the PRACH may be located at the same frequency in the supporting cell as in the compensating cell, and then the PRACH in the lower diagram would have been located as in the upper diagram and thus only the locations of PUSCH would have been empty in the lower diagram within the sub-band.

Signaling in case of cell outage and compensation will now be discussed, with particular reference to the embodiments discussed above and in case of LTE.

Determining, which also may be referred to as tuning or setting of, the sub-band, i.e. LIB, or LIBC, may for example be carried out in the management entity 140, or the NMS or DM, as discussed above in connection with FIG. 2. Any measurements to be used, e.g., quality, may then be sent over the Itf-N to NMS, or Itf-S to DM. Moreover, dedicated statistics may be reported from the compensating cell 135 and the supporting cell 115 to the management entity 140.

Determining of the sub-band, i.e. LIB, or LIBC may also be executed in a base station, i.e. an eNodeB in the case of LTE, as also mentioned above, e.g. the supporting base station 110 and/or the compensating base station 130. Configurations and/or parameters related to the embodiments mentioned above, e.g, relating to the $LIB_{min}$, the $LIB_{max}$, the location of sub-band, the location of LIBC, and outage target qualities, may be signaled to the base stations using e.g. Itf-N from NMS, Itf-S from DM, or some other interface from the management entity 140.

In some embodiments the configurations and/or parameters may be determined by one or more eNodeBs and signaled over the X2 interface to other eNodeBs. For example, the compensating base station 130 may determine a LIB (e.g. width and location) that is considered suitable and signal this to the supporting base station 110.

Signalling for controlling the sub-band may be implemented in LTE over the X2 interface using the Load information message, as described in 3GPP Technical Specification 36.423, including either the UL High Interference Indication Information Element or the UL Interference Overload Information Element to indicate the sub-band in terms of RBs. An eNodeB receiving a Load information message is expected to consider the high interference sensitivity or the overload in the scheduler. One way of doing this may be to consider RSRP measurements to identify UEs that should not be scheduled within the sub-band. The severity of the overload may be indicated by an enumerable (high interference, medium interference, low interference). The high interference sensitivity may be indicated by a bitmap (sensitive or not). Additional information to the supporting cell 115 may comprise the cause of the high interference sensitivity indication, such as normal operation, cell outage compensation, etc.

Further, in some embodiments the compensating base station 130 may request information regarding a time and frequency pattern of PRACH in the supporting cell 115 over X2 and choose a non-overlapping PRACH. In some embodiments the compensating base station 130 may further request a change of the time and frequency pattern of the PRACH in the supporting cell 115. This way the time and frequency patterns may be coordinated. The compensating base station 130 may, in case of multiple compensating cells, provide one time and frequency pattern of the PRACH to all compensating cells for co-ordination purposes. This may for example be implemented by dedicated messages over the X2 interface. Moreover, in case of multiple compensating cells, some compensating cell may be unaware of another compensating cell, but they may still share one or more supporting cells. In such case, the time and frequency patterns of the PRACH may be coordinated according to the following:

A first compensating cell co-ordinates its PRACH with its supporting cells.

A second compensating cell signals to its supporting cells to co-ordinate PRACH.

One supporting cell of the second compensating cell is already a supporting cell to the first compensating cell, and the instead sends information about its already coordinated PRACH to the second compensating cell.

In some embodiments, the outage cell 155 may during nominal operation, i.e. before cell outage, identify its potential compensating network of one or more compensating cells by using for example UE or network measurements. Once the outage cell 155 has identified its compensation network it may inform the identified one or more compensating cells, through e.g. the X2 interface, that when the outage cell 155 is subject to cell outage, the one or more compensating cells may begin compensating for the outage. The identified one or more compensating cells may start compensating when they detect that the outage cell 155 is in outage. Each of the one and more compensating cells may then, in similar manner, identify and inform its potential supporting network of one and more supporting cells to start acting as supporting cells according to embodiments herein. This may be done using for example the X2 interface.

In some embodiments, the outage cell 155 may be subject to outage but the outage base station 150 that serves the outage cell 155 may maintain communication over X2 to other cells and base stations. Thereby the outage base station 155 may detect cell outage in the outage cell 155 and signal to its compensating network to start compensating. Again, each one of the one and more compensating cells may then, in similar manner, identify and inform its potential supporting network of one and more supporting cells to start acting as supporting cells according to embodiments herein. Again this may be done using for example the X2 interface.

Figure 12:
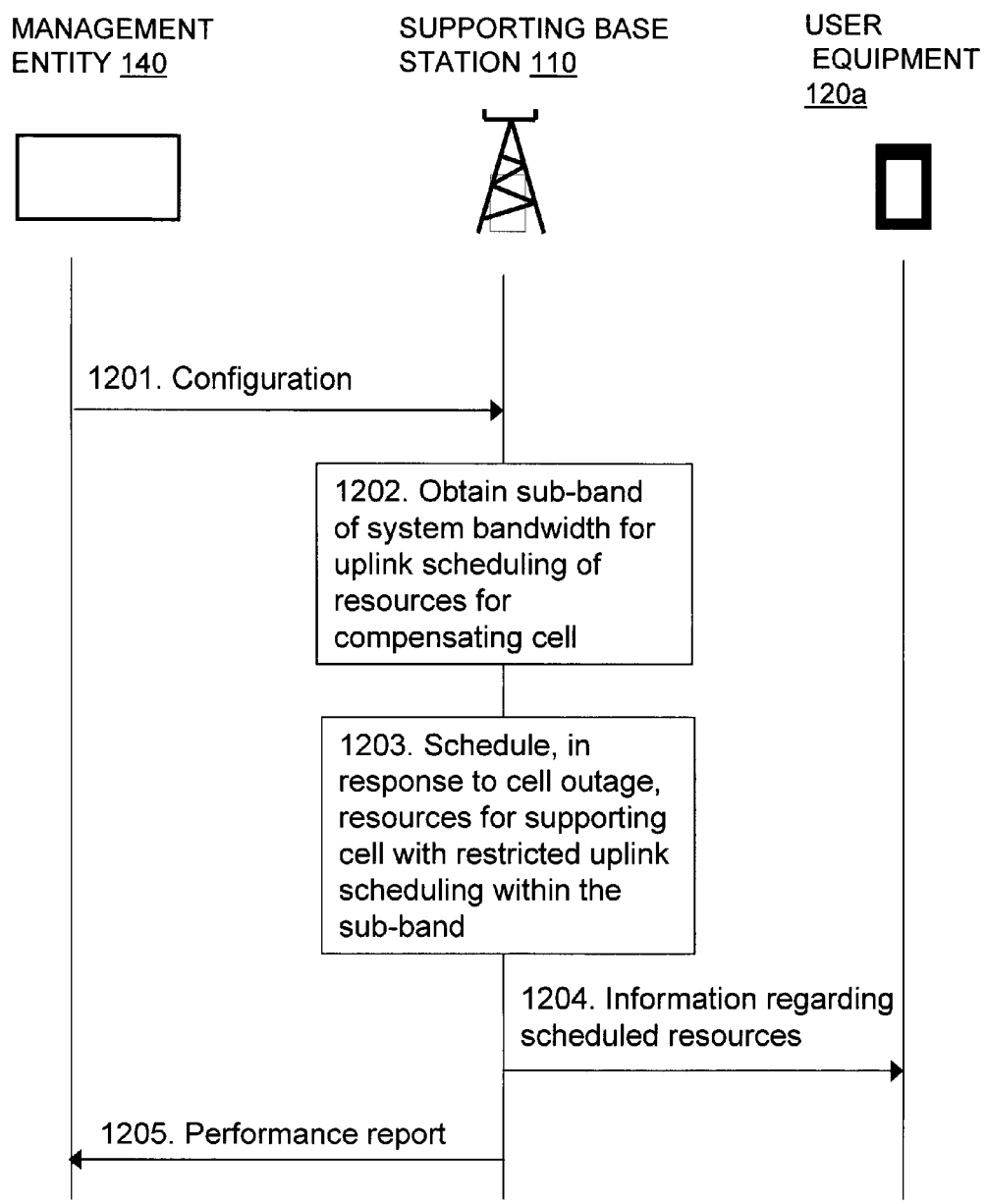
FIG. 12 is a combined signalling diagram and flowchart illustrating embodiments herein.

Embodiments herein relating to the method in a network node for supporting compensation of cell outage in the cellular communications network 100, will now be further described with reference to the combined signaling diagram and flowchart depicted in FIG. 12. The embodiments and actions to be discussed here correspond to a situation where the network node 110, 140 is the supporting base station 110, as mentioned previously. The actions may be taken in any suitable order and may be combined, as realized by the skilled person.

Action 1201

This action is optional for embodiments herein. The supporting base station 110 may receive the configuration from the management entity 140. As already mentioned, the configuration is for configuring behavior of the supporting base station 110 for serving the supporting cell during the cell outage. The configuration may e.g. comprise a command to act as supporting cell, an identifier of the compensating cell 135, a command to provide the performance report and optionally also what to include therein. For the embodiments where the sub-band is being wholly or partly obtained by being received from the management entity 140, this may be accomplished by comprising information about the sub-band in the configuration. As should be realized, it may be of interest for the supporting base station 115 to be informed about the compensating base station 135 to be able to determine which, if any, user equipment that as an exception may still be scheduled within sub-band, as discussed above.

As should be realized, this action corresponds fully or partially to the previously described action 501.

Action 1202

The supporting base station 110 may obtain the sub-band, here within the supporting base station 110 as such. See examples and embodiments explained above for further details and variants on how the sub-band may be obtained.

As should be realized, this action corresponds fully or partially to the previously described action 502.

Action 1203

The supporting base station 110 may, in response to the cell outage, schedule resources for the supporting cell 115 with restricted uplink scheduling within the sub-band.

As should be realized, this action corresponds fully or partially to the previously described action 503.

Action 1204

The supporting base station 110 may send information about the scheduled resources to the user equipment 120a. This is an example of when applying the scheduled resources in the supporting cell 115, as discussed above for action 503, comprises sending information regarding the scheduled resources to one or more user equipments being served in the supporting cell 115. Owing to the restricted uplink scheduling within the sub-band, the user equipment 120a, and thereby the supporting cell 115, will cause the less interference within the sub-band in the compensating cell 135, as mentioned above.

As should be realized, this action corresponds fully or partially to the previously described action 504.

Action 1205

This is an optional action for embodiments herein. The supporting base station 110 may send the performance report, regarding serving of the supporting cell 115 with the restricted uplink scheduling within the sub-band, to the management entity 140. The performance report may e.g. comprise the previously mentioned observed uplink and/or downlink quality indicators for the supporting cell 115, or other parameters that may be relevant for determining the sub-band or LIBC and/or for measuring performance relevant for the supporting cell. The performance report may be used by the management entity 140 to control the behavior of the supporting cell 115 based on the performance report, e.g. by sending a new configuration to the supporting base station, as mentioned above under action 1201. And/or the performance report may be used to report back status during the cell outage, e.g. what the "cost" is in terms of reduced performance and/or capacity in the supporting cell 115. Such information may e.g. be of interest for an operator of the cellular communications network 100.

As should be realized, this action corresponds fully or partially to the previously described action 505.

Figure 13:
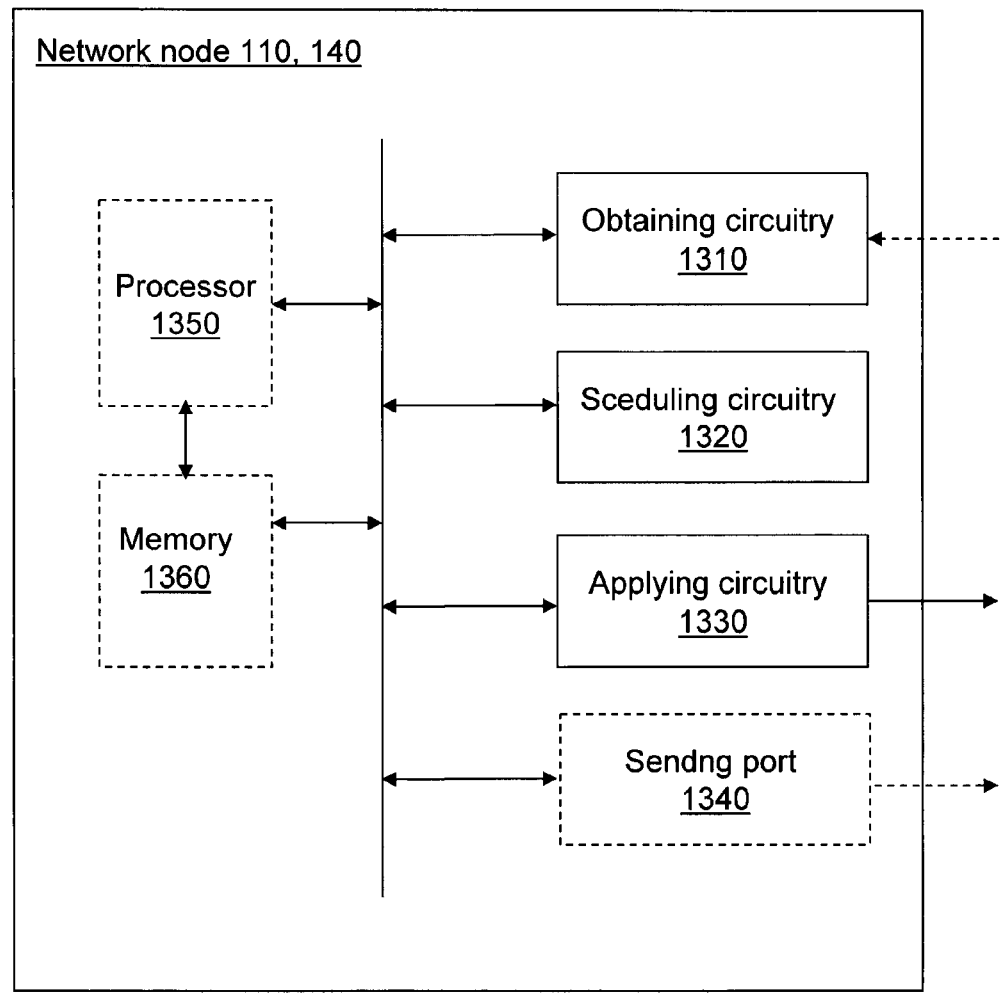
FIG. 13 is a schematic block diagram illustrating a network node according to embodiments herein.

To perform the actions above for supporting compensation of cell outage in the cellular communications network 100, the network node 110, 140 may comprise an arrangement schematically depicted in FIG. 13. As mentioned above, the cellular communications network 100 comprises the compensating cell 135 for compensating the cell outage and the supporting cell 115 neighbouring the compensating cell 135.

The network node 110, 140 comprises an obtaining circuitry 1310 configured to obtain the sub-band of the system bandwidth for the uplink scheduling of resources for the compensating cell 135. For embodiments mentioned above where the network node 110, 140 is the supporting base station 110 for serving the supporting cell 115, the obtaining circuitry 1310 may be configured to obtain the sub-band by receiving the sub-band from another network node 140. For example, if the network node is the supporting base station 110, said another node may be the management entity 140.

Further the obtaining circuitry 1310 may be configured to obtain the sub-band by determining the sub-band, e.g. compute the sub-band based on an algorithm, as also mentioned above.

The obtaining circuitry 1310 may be further configured to:
  increase a previously obtained sub-band when at least one of the one or more observed uplink and downlink quality indicators is above the respective threshold value for target downlink quality and target uplink quality, and/or
  decrease a previously obtained sub-band when at least one the observed uplink and downlink quality indicators is below the respective threshold value for target downlink quality and target uplink quality.

The obtaining circuitry 1310 may further be configured to stop the increase when the maximum sub-band is reached, and/or stop the decrease when the minimum sub-band is reached.

Moreover, is some embodiments the obtaining circuitry 1310 is further configured to obtain a configuration for configuring behavior of the network node 110, 140 during the cell outage.

The network node 110, 140 further comprises a scheduling circuitry 1320 configured to, in response to the cell outage, schedule the resources for the supporting cell 115 with the restricted uplink scheduling within the sub-band. When the network node 110, 140 is the supporting base station 110 and in case of LTE, the scheduling circuitry 1320 may correspond to the scheduler.

The restricted uplink scheduling within the sub-band may be restricted by the scheduling circuitry 1320 being configured to deliberately avoid scheduling any, or at least some, resources within the sub-band for the supporting cell 115.

The scheduling circuitry 1320 may be configured to schedule resources, as an exception, within the sub-band for the supporting cell 115:

when there is need for scheduling of more resources than are available outside the sub-band for the supporting cell 115, and/or regarding a user equipment, e.g. user equipment 120a, that has a high path loss to the compensating cell 135 and thereby is expected to generate low uplink inter-cell interference in the compensating cell 135.

Said resources being scheduled within the sub-band may be:

selected from one or both ends of the sub-band, thereby leaving an inner region thereof without scheduled resources, and/or randomly selected within the sub-band.

In some embodiments the obtaining circuitry 1310 is further configured to obtain a LIB Center, "LIBC", to be comprised in the sub-band, and the scheduling circuitry 1320 is configured to schedule the uplink resources for the supporting cell 115 by selecting resources from one or both ends of a system bandwidth of the supporting cell 115 and gradually towards the LIBC, thereby obtaining the sub-band as a bandwidth adjoining the LIBC and with the restricted uplink scheduling within the sub-band. The LIBC may be obtained within the Physical Random Access CHannel, "PRACH", bandwidth of the compensating cell 135.

Moreover, the network node 110, 140 comprises an applying circuitry 1330 configured to apply the scheduled resources in the supporting cell 115, thereby supporting the compensation of cell outage by causing less interference within the sub-band in the compensating cell 135.

In case of the embodiments mentioned above where the network node is the supporting base station 110, the applying circuitry 1330 may be further configured to send information regarding the scheduled resources to one or more user equipments, e.g. user equipment 120a, being served in the supporting cell 115.

In case of the embodiments mentioned above where the network node is the management entity 140, the scheduled resources may be applied in the supporting cell 115 by the applying circuitry 1330 being configured to send information about the scheduled resources and a command to the supporting base station 110. The command commanding the supporting base station 110 to send information regarding relevant scheduled resources to respective one or more UEs being served, for example the user equipment 120a.

In case of the embodiments mentioned above where the network node is the supporting base station 110 for serving the supporting cell 115, the network node 110, 140 may further comprise a sending port 1340 configured to send, to the management entity 140, the performance report regarding serving of the supporting cell 115 with the restricted uplink scheduling within the sub-band.

The scheduling circuitry 1320 and the applying circuitry 1330 may be further configured to schedule and apply, in response to the cell outage, resources for the compensating cell 135 within the sub-band for one or more user equipments, e.g. user equipment 120c, being served in the compensating cell 135 in the geographical area where said one or more user equipments before the outage would have been served in the outage cell 155.

The embodiments of the network node 110, 140 may be implemented through one or more processors, such as a processor 1350 in the network node 110, 140 depicted in FIG. 13, together with computer program code for performing the functions and actions of embodiments herein. In some embodiments the circuitry discussed above may be fully or partially implemented by the processor 1350.

The computer program code mentioned above may also be provided as a computer program product, for instance in the form of a data carrier carrying computer program code for performing the embodiments herein when being loaded into the in the network node 110, 140. One such carrier may be in the form of a CD or DVD. It is however feasible with other data carriers such as a memory stick, memory card or hard drive. The computer program code may furthermore be provided as pure program code on a server for download to the network node 110, 140. The computer program code may furthermore be provided in the form of a data file or files on, or available through, a server for download. The file or files may be executable files for direct or indirect download to and execution on the network node 110, 140, or may be for intermediate download and compilation to make them executable before download to and for execution in the network node 110, 140. The server may be accessible over a computer network, such as the Internet, and may e.g. be a web or ftp server.

The network node 1200 may further comprise a memory 1360 comprising one or more memory units. The memory 1360 is arranged to store data, such as values mentioned above relating to the sub-band, LIBC, thresholds, quality indicators etc., configurations and/or applications to perform the method when being executed in the network node 110, 140.

Those skilled in the art will also appreciate that the obtaining circuitry 1310, the scheduling circuitry 1320 and the applying circuitry 1330, may refer to a combination of analog and digital circuits, and/or one or more processors configured with software and/or firmware (e.g., stored in memory) that, when executed by the one or more processors such as the processor 1350, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Note that outage cell, cell in outage etc., in the present disclosure may refer to a cell that need not by fully in outage, but can be so in part, e.g. a sector of a sectorized base station, which sector is in outage. As the skilled person realizes, embodiments herein are applicable also in such situation.

Many embodiments and examples that have been described and discussed herein relate to LTE and embodiments herein are particularly well suited to be used with LTE based systems. However, this is not to be construed as limiting embodiments herein to LTE only.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a network node for supporting compensation of cell outage in a cellular communications network, the cellular communications network comprising a compensating cell for compensating the cell outage and a supporting cell neighboring the compensating cell, wherein the method comprises:

obtaining a sub-band of a system bandwidth for uplink scheduling of resources for the compensating cell;

obtaining a Low Interference Bandwidth Center (LIBC) to be comprised in the sub-band;

scheduling, in response to the cell outage, resources for the supporting cell with restricted uplink scheduling within the sub-band, wherein scheduling the resources for the supporting cell comprises selecting resources from one or both ends of the system bandwidth of the supporting cell and gradually towards the LIBC, thereby obtaining the sub-band as a bandwidth adjoining the LIBC and with the restricted uplink scheduling within the sub-band; and applying the scheduled resources in the supporting cell, thereby supporting the compensation of the cell outage by causing less interference within the sub-band in the compensating cell.

2. The method of claim 1, wherein the network node is a base station or a management entity for a base station in the cellular communications network.

3. The method of claim 1, wherein the restricted uplink scheduling within the sub-band is restricted by deliberately avoiding scheduling at least some resources within the sub-band for the supporting cell.

4. The method of claim 1, wherein the resources, as an exception, are scheduled within the sub-band for the supporting cell:

when there is need for scheduling of more resources than are available outside the sub-band for the supporting cell, and/or regarding a user equipment that has a high path loss to the compensating cell and thereby is expected to generate low uplink inter-cell interference in the compensating cell.

5. The method of claim 4, wherein said resources being scheduled within the sub-band are:

selected from one or both ends of the sub-band, thereby leaving an inner region thereof without the scheduled resources, and/or randomly selected within the sub-band.

6. The method of claim 1, wherein the sub-band is obtained based on one or more of the following parameters:

one or more observed uplink and downlink quality indicators associated with the supporting cell and/or one or more other supporting cells that also are comprised in the cellular communications network and neighboring the compensating cell;

a respective threshold value for target downlink quality and target uplink quality; and a minimum sub-band and a maximum sub-band.

7. The method of claim 6, wherein obtaining the sub-band comprises:

increasing a previously obtained sub-band when at least one of the one or more observed uplink and downlink quality indicators is above the respective threshold value for the target downlink quality and the target uplink quality, and/or decreasing a previously obtained sub-band when at least one of the observed uplink and downlink quality indicators is below the respective threshold value for the target downlink quality and the target uplink quality.

8. The method of claim 7, wherein the increasing is stopped when the maximum sub-band is reached, and/or the decreasing is stopped when the minimum sub-band is reached.

9. The method of claim 1, wherein the supporting cell is one of multiple supporting cells that are comprised in the cellular communications network, and wherein the sub-band is same for the multiple supporting cells.

10. The method of claim 1, wherein the sub-band has a size that is determined based on an estimated radio coverage loss resulting from the cell outage.

11. The method of claim 1, wherein the sub-band has a size that is determined so that at least support for some basic service is enabled for a user equipment being served in the compensating cell in a geographical area where the user equipment before the cell outage would have been served in an outage cell.

12. The method of claim 1, wherein the LIBC is obtained within a Physical Random Access Channel (PRACH) bandwidth of the compensating cell.

13. The method of claim 1, wherein the sub-band comprises a Physical Random Access Channel (PRACH) bandwidth of the compensating cell.

14. The method of claim 1, wherein the method further comprises obtaining a configuration for configuring behavior of the network node during the cell outage.

15. The method of claim 1, wherein the network node is a supporting base station for serving the supporting cell and the sub-band is being obtained by receiving the sub-band from another network node.

16. The method of claim 1, wherein the network node is a supporting base station for serving the supporting cell, and wherein the applying of the scheduled resources in the supporting cell comprises sending information regarding the scheduled resources to one or more user equipments being served in the supporting cell.

17. The method of claim 1, wherein the network node is a supporting base station for serving the supporting cell and the method further comprises sending, to a management entity, a performance report regarding serving of the supporting cell with the restricted uplink scheduling within the sub-band.

18. The method of claim 1, further comprising scheduling and applying, in response to the cell outage, resources for the compensating cell within the sub-band for one or more user equipments being served in the compensating cell in a geographical area where said one or more user equipments before the cell outage would have been served in an outage cell.

19. A network node for supporting compensation of cell outage in a cellular communications network, the cellular communications network comprising a compensating cell for compensating the cell outage and a supporting cell neighboring the compensating cell, wherein the network node comprises:

obtaining circuitry configured to obtain a sub-band of a system bandwidth for uplink scheduling of resources for the compensating cell and to obtain a Low Interference Bandwidth Center (LIBC) to be comprised in the sub-band;

scheduling circuitry configured to, in response to the cell outage, schedule resources for the supporting cell with restricted uplink scheduling within the sub-band by selecting resources from one or both ends of the system bandwidth of the supporting cell and gradually towards the LIBC, thereby obtaining the sub-band as a bandwidth adjoining the LIBC and with the restricted uplink scheduling within the sub-band; and applying circuitry configured to apply the scheduled resources in the supporting cell, thereby supporting the compensation of the cell outage by causing less interference within the sub-band in the compensating cell.

20. The network node of claim 19, wherein the network node is a base station or a management entity for a base station in the cellular communications network.

21. The network node of claim 19, wherein the restricted uplink scheduling within the sub-band is restricted by the scheduling circuitry being configured to deliberately avoid scheduling at least some resources within the sub-band for the supporting cell.

22. The network node of claim 19, wherein the scheduling circuitry is configured to schedule the resources, as an exception, within the sub-band for the supporting cell:
when there is need for scheduling of more resources than are available outside the sub-band for the supporting cell, and/or
regarding a user equipment that has a high path loss to the compensating cell and thereby is expected to generate low uplink inter-cell interference in the compensating cell.

23. The network node of claim 22, wherein said resources being scheduled within the sub-band are:
selected from one or both ends of the sub-band, thereby leaving an inner region thereof without the scheduled resources; and/or
randomly selected within the sub-band.

24. The network node of claim 19, wherein the sub-band is obtained based on one or more of the following parameters:
one or more observed uplink and downlink quality indicators associated with the supporting cell and/or one or more other supporting cells that also are comprised in the cellular communications network and neighboring the compensating cell;
a respective threshold value for target downlink quality and target uplink quality; and
a minimum sub-band and a maximum sub-band.

25. The network node of claim 24, wherein the obtaining circuitry for obtaining the sub-band is further configured to:
increase a previously obtained sub-band when at least one of the one or more observed uplink and downlink quality indicators is above the respective threshold value for the target downlink quality and the target uplink quality; and/or
decrease a previously obtained sub-band when at least one of the observed uplink and downlink quality indicators is below the respective threshold value for the target downlink quality and the target uplink quality.

26. The network node of claim 25, wherein the obtaining circuitry for obtaining the sub-band is further configured to stop the increase when the maximum sub-band is reached, and/or stop the decrease when the minimum sub-band is reached.

27. The network node of claim 19, wherein the supporting cell is one of multiple supporting cells that are comprised in the cellular communications network, and wherein the sub-band is same for the multiple supporting cells.

28. The network node of claim 19, wherein the sub-band has a size that is determined based on an estimated radio coverage loss resulting from the cell outage.

29. The network node of claim 19, wherein the sub-band has a size that is determined so that at least support for some basic service is enabled for a user equipment being served in the compensating cell in a geographical area where the user equipment before the cell outage would have been served in an outage cell.

30. The network node of claim 19, wherein the LIBC is obtained within a Physical Random Access Channel (PRACH) bandwidth of the compensating cell.

31. The network node of claim 19, wherein the sub-band comprises a Physical Random Access Channel (PRACH) bandwidth of the compensating cell.

32. The network node of claim 19, wherein the obtaining circuitry is further configured to obtain a configuration for configuring behavior of the network node during the cell outage.

33. The network node of claim 19, wherein the network node is a supporting base station for serving the supporting cell and the obtaining circuitry is configured to obtain the sub-band by receiving the sub-band from another network node.

34. The network node of claim 19, wherein the network node is a supporting base station for serving the supporting cell and wherein the applying circuitry for applying of the scheduled resources in the supporting cell is further configured to send information regarding the scheduled resources to one or more user equipments being served in the supporting cell.

35. The network node of claim 19, wherein the network node is a supporting base station for serving the supporting cell and the network node further comprises a sending port configured to send, to a management entity, a performance report regarding serving of the supporting cell with the restricted uplink scheduling within the sub-band.

36. The network node of claim 19, wherein the scheduling circuitry and the applying circuitry are further configured to schedule and apply respectively, in response to the cell outage, resources for the compensating cell within the sub-band for one or more user equipments being served in the compensating cell in a geographical area where said one or more user equipments before the cell outage would have been served in an outage cell.

* * * * *